United States Patent
Li et al.

(10) Patent No.: US 9,797,732 B2
(45) Date of Patent: Oct. 24, 2017

(54) METHOD AND APPARATUS FOR USING MAP INFORMATION AIDED ENHANCED PORTABLE NAVIGATION

(71) Applicant: INVENSENSE, INC., San Jose, CA (US)

(72) Inventors: Tao Li, Calgary (CA); Jacques Georgy, Calgary (CA); Da Wang, Calgary (CA)

(73) Assignee: InvenSense, Inc., San Jose, CA (US)

( * ) Notice: Subject to any disclaimer, the term of this patent is extended or adjusted under 35 U.S.C. 154(b) by 25 days.

(21) Appl. No.: 14/845,903

(22) Filed: Sep. 4, 2015

(65) Prior Publication Data
US 2016/0069690 A1    Mar. 10, 2016

Related U.S. Application Data

(60) Provisional application No. 62/047,511, filed on Sep. 8, 2014.

(51) Int. Cl.
| | |
|---|---|
| *G01C 21/00* | (2006.01) |
| *G01C 21/20* | (2006.01) |
| *G01S 19/42* | (2010.01) |
| *G01C 21/30* | (2006.01) |

(52) U.S. Cl.
CPC ......... *G01C 21/206* (2013.01); *G01C 21/005* (2013.01); *G01C 21/20* (2013.01); *G01C 21/30* (2013.01); *G01S 19/42* (2013.01)

(58) Field of Classification Search
CPC .... G01C 21/005; G01C 21/20; G01C 21/206; G01C 21/30; G01S 19/42
USPC ................................................. 701/411, 412
See application file for complete search history.

(56) References Cited

U.S. PATENT DOCUMENTS

| | | | | |
|---|---|---|---|---|
| 7,653,394 B2* | 1/2010 | McMillin | ................ | H04L 45/00 370/331 |
| 8,712,686 B2* | 4/2014 | Bandyopadhyay | .... | G01C 17/38 701/445 |
| 9,389,085 B2* | 7/2016 | Khorashadi | ............ | G01C 21/20 |
| 2011/0178705 A1* | 7/2011 | Pakzad | .................. | G01C 21/20 701/533 |
| 2011/0208424 A1* | 8/2011 | Hirsch | ................ | G01C 21/165 701/532 |
| 2012/0169542 A1* | 7/2012 | Mathews | ................ | G01S 5/021 342/450 |
| 2014/0079297 A1* | 3/2014 | Tadayon | .................. | G06K 9/00 382/118 |

* cited by examiner

*Primary Examiner* — Atul Trivedi
(74) *Attorney, Agent, or Firm* — Bay Area Technology Law Group PC

(57) ABSTRACT

This disclosure is directed to enhancing the navigation solution of a portable device using map information. Sensor data for the portable device may be used to derive a navigation solution. Position information for the device may be estimated using the navigation solution. Map information for an area encompassing a current location of the user may also be obtained. Multiple hypotheses regarding possible positions of the portable device may be generated using the estimated position information and the map information. By managing and processing the hypotheses, updated estimated position information may be provided. The updated estimated position information may be provided as output or feedback to enhance the navigation solution.

44 Claims, 22 Drawing Sheets

METHOD AND APPARATUS FOR USING MAP INFORMATION AIDED ENHANCED PORTABLE NAVIGATION

CROSS REFERENCE TO RELATED APPLICATIONS

This application claims priority from and benefit of U.S. Provisional Patent Application Ser. No. 62/047,511, filed Sep. 8, 2014, which is entitled "METHOD AND APPARATUS FOR USING MAP MATCHING AND CONSTRAINING FOR ENHANCED PORTABLE NAVIGATION," which is incorporated by reference in its entirety.

FIELD OF THE PRESENT DISCLOSURE

The present disclosure relates to a method and apparatus for enhancing a navigation solution of a device within a platform (such as for example person, vehicle, or vessel) through the use of map aided and/or map constraining to the navigation solution, wherein the device can be strapped or non-strapped to the platform, and wherein in case of non-strapped mobility of the device may be constrained or unconstrained within the platform, and wherein the device can be tilted to any orientation and still provide seamless navigation.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. However, some mass market applications require seamless positioning capabilities in all kinds of environments such as malls, offices or underground parking lots. In the absence of GNSS signals in indoor environments, the conventional strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications.

Pedestrian Dead Reckoning (PDR) is an example of portable device indoor/outdoor positioning techniques, and has become the focus of industrial and academic research recently. Similar to the SINS, PDR accumulates successive displacement from a known starting point to derive the position. This displacement (step length) can be estimated with various algorithms within a certain accuracy using the inertial sensor measurements. The position error using step lengths from PDR accumulates much slower than that from the accelerometer derived displacement from SINS. The PDR shows improved performance over SINS without GNSS updates. However, PDR still lacks robustness because of the accumulated heading error. This shortcoming may cause a skewed path over time and produce position estimates that might not be consistent with the building layout. Therefore, the resulting navigation trajectories may cross walls, floors or other obstacles. In order to avoid these types of navigation trajectory and building layout inconsistencies, map information may be used to constrain the PDR solution to areas indicated as possible routes or a determined position may be updated to match an assumed position derived from map information. As used herein, the map aided techniques of this disclosure include either or both of constraining the derived position of a user or updating a derived position to a position determined from map information.

As mentioned, map information can be used to improve both the reliability and positioning accuracy of the navigation system. In order to use map information in a navigation system, various map aided algorithms have been proposed and applied in the prior art. Map aided algorithms can be generally classified into four categories: geometric, topological, probabilistic and other advanced techniques.

Geometric map aided algorithms typically consider only the geometric relationship between a user position and a map. They are widely used in the vehicle navigation application in which spatial road networks are abstracted as node points and curves. The most commonly used geometric map-aided algorithm is a point-to-point aided technique that matches the user position to a closest node point of a road segment. While easy to implement, it is sensitive to the way the road network was digitized. Another geometric map-aided algorithm is point-to-curve aided. Such techniques match user positions to the closet curve of a road. Each of the curves comprises line segments which are piecewise linear. Distance may be calculated from the user position to each of the line segments. The line segment that gives the smallest distance is selected as the matched road. Although it is more efficient than point-to-point aided, it may be unstable in dense road networks. Yet another geometric algorithm is curve-to-curve aided, which matches a short history of a user trajectory to curves of roads and may chose a road curve with the shortest distance to the user trajectory. Unfortunately, this approach is quite sensitive to outliers and often gives unexpected results as a result.

Topological map aided algorithms make use of historical user trajectory information, (which might include the previously identified road segment) and topological information such as link connectivity, road classification, road restriction information (single direction, turn restrictions), in addition to the basic geometric information. Various previous works have applied topological information at different levels. For example, (i) using topological information to identify a set of candidate links, (ii) and to identify correct link from a set of candidate links. Therefore, topological map aided algorithms normally outperform algorithms relying only on geometric techniques. Moreover, a weight-based topological map aided may further improve the match aided performance. Such techniques use the correlation values in network geometry and topology information and positioning information from a GPS/DR integrated system as the weight for different road link candidates. The link with the highest weight score may be selected as the correct road segment. However, the misidentification of a road link in previous epoch may have significant negative effects on the following map aided results.

Conventional probabilistic map aided algorithms use an error elliptical or rectangular region around the user position from the navigator. The error region depends on the variance of the estimated navigation position. The error region is then superimposed on the road network to identify a road segment on which the user is travelling. If an error region contains a number of segments, then the evaluation of candidate segments are carried out using heading, connectivity, and closeness criteria. In order to improve the computation efficiency and system reliability, the error region can be only constructed when the user travels through a junction. This is because the construction of an error region at each epoch may lead to incorrect link identification when other road links are close to the link on which the user is travelling.

Advanced map aided algorithms generally refer to more advanced techniques such as Kalman filters, particle filters, fuzzy logic models or Bayesian inferences. For example, a Kalman filter may be used to propagate the user position either from GPS or GPS/DR and to re-estimate the user position to reduce the along track error by using an orthogonal projected map matched position. Similar concepts may also be used with a particle filter to predict and update the user's position. Further, a fuzzy inference system may be used to derive the matched road link with i) the distance between the user position and candidate links and ii) the difference between the platform direction and the link direction. A still further example is the use of a Multiple Hypothesis Technique (MHT) for map aided, by employing pseudo measurements (projected position and heading) from all possible links within the validation region of the current user's position and a topological analysis of the road networks to derive a set of hypotheses and probabilities.

Despite the variety of conventionally available map aided algorithms, either geometric, topological, probabilistic or advanced methods, all may be considered to be based on the assumption that a user is constrained to the network of roads which can be abstracted as linked points, lines and curves. While this assumption may be sufficiently valid in many outdoor land vehicle navigation applications, a problem may be encountered in complex indoor environments, where the rooms, elevators, corridors and similar structures cannot be simplified as the aforementioned points, lines and curves. Some researchers use particle filters with geometric constraint (walls, inaccessible areas) information from a building floor plan to improve the indoor positioning accuracy, however, a user can enter or exit rooms in a random way and simple geometric constraints are undesirable in these scenarios. Furthermore, such techniques have not accommodated multi-floor situations. In contrast, conventional multi-floor map-aided techniques have relied only on geometric information to identify the location of stairs. Such approaches may not be sufficiently reliable, particularly when drift in the navigation solution occurs. Furthermore, most of the existing map aided algorithms ignore the user motion status information. The user's motion status such as going up/down stairs, standing/walking on escalators, or using elevators is beneficial to validate the candidate matched level change links or objects in the indoor navigation applications. Although the advanced algorithms such as fuzzy logics or particle filters have the potential to offer improved performance, they may not be generally suitable for real-time or causal applications due to the heavy computation burden.

Accordingly, it would be desirable to provide navigation techniques using available map information, particularly indoor maps, to enhance the accuracy and reliability of positioning applications for portable devices. It would similarly be desirable to provide map information aided techniques that operate well with seamless outdoor and indoor transition as well as handling multi-level indoor maps to reliably navigate a user in a complex multi-level indoor environment. It would further be desirable to provide map information aided techniques that operate in real time with a portable device employing motion sensors. Moreover, it would be desirable to provide map aided techniques adapted for efficient operation in client and server modes, by enabling a server to use uploaded position and motion information of a user to generate map matched results and the results for real-time navigation. As will be described in the following materials, this disclosure satisfies these and other needs.

SUMMARY

As will be described in detail below, this disclosure includes a method for enhancing a navigation solution of a portable device and a platform using map information, wherein the mobility of the device is constrained or unconstrained within the platform and wherein the device may be tilted to any orientation. The method may include obtaining sensor data for the portable device, deriving a navigation solution based at least in part on the sensor data, providing estimated position information for the portable device based at least in part on the navigation solution, obtaining map information for an area encompassing a current location of the user, generating multiple hypotheses regarding possible positions of the portable device based at least in part on the estimated position information and the map information, managing the hypotheses based at least in part on the estimated position information and the map information, processing the managed hypotheses to update the estimated position information for the portable device and providing an enhanced navigation solution using the updated estimated position information.

This disclosure also includes a portable device for providing an enhanced navigation solution using map information. The device may include a sensor assembly integrated with the portable device, configured to output data representing motion of the portable device and a processor configured to implement a navigation module for deriving a navigation solution based at least in part on the sensor data and a map module having a position estimator for providing estimated position information for the portable device based at least in part on the navigation solution, a map handler for obtaining map information for an area encompassing a current location of the user and a hypothesis analyzer for generating and managing multiple hypotheses regarding possible positions of the portable device based at least in part on the estimated position information and the map information, wherein the map module processes the managed hypotheses to update the estimated position information for the portable device.

This disclosure also includes a system for providing an enhanced navigation solution using map information. The system may include a portable device with an integrated sensor assembly, configured to output data representing motion of the portable device and a processor configured to implement a navigation module for deriving a navigation solution based at least in part on the sensor data. The system may also include remote processing resources that receive the navigation solution from the portable device. The remote processing resources may have a processor configured to implement a map module having a position estimator for providing estimated position information for the portable device based at least in part on the navigation solution, a map handler for obtaining map information for an area encompassing a current location of the user and a hypothesis analyzer for generating and managing multiple hypotheses regarding possible positions of the portable device based at least in part on the estimated position information and the map information, wherein the map module processes the managed hypotheses to update the estimated position information for the portable device and wherein the remote processing resources transmit the updated estimated position information to the portable device.

DETAILED DESCRIPTION

Figure 1:
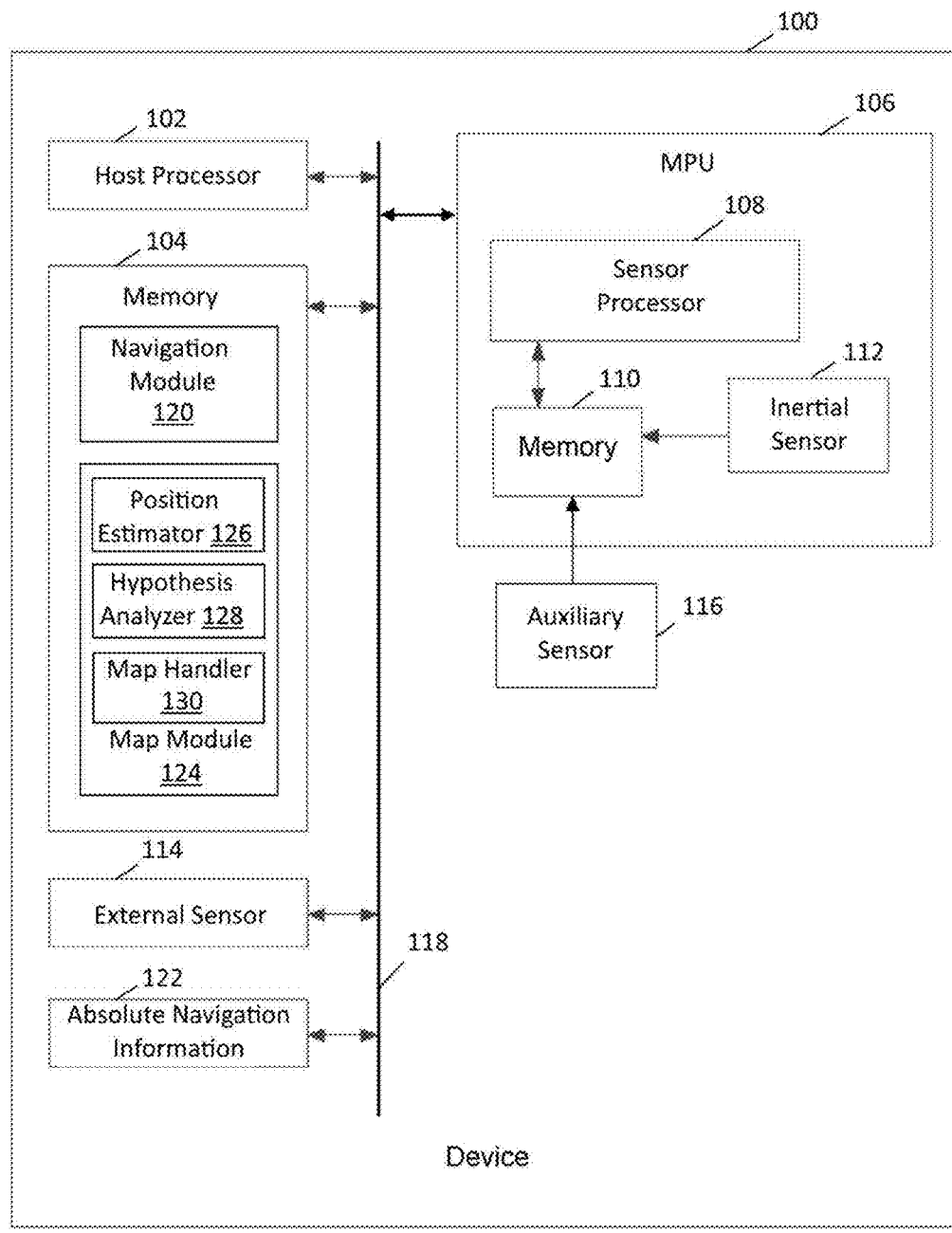
FIG. 1 is schematic diagram of a portable device for enhancing a navigation solution according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The techniques of this disclosure are directed to enhancing a navigation solution of a portable device using map information. Often, such portable devices may be associated with a platform that transports the device. The platform may be the user, as in the example of a smartphone being carried as a user walks, runs, swims or otherwise undergoes locomotion. The platform may also be considered a vehicle or vessel that conveys the user and the portable device. Although the portable device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the portable device may be strapped to the platform, such as with a vehicle mount, or may be non-strapped. When non-strapped, the mobility of the device may be constrained or unconstrained within the platform and as a result, circumstances may exist such that the device can be tilted to any orientation with respect to the user or platform.

As will be described in further detail below, the techniques for enhancing a navigation solution of a portable device and a platform using map information involve obtaining sensor data for the portable device. To help illustrate these aspects, a representative portable device 100 is depicted in FIG. 1 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

Alternatively or in addition, device 100 may implement a sensor assembly in the form of external sensor 114. External sensor may represent one or more sensors as described above, such as an accelerometer and/or a gyroscope, which output data for use in deriving a navigation solution. As used herein, "external" means a sensor that is not integrated with MPU 106 and may be remote or local to device 100. Also alternatively or in addition, MPU 106 may receive data from an auxiliary sensor 116 configured to measure one or more aspects about the environment surrounding device 100. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to derive a navigation solution for portable device 100 may be implemented through navigation module 120 as a set of suitable instructions stored in memory 104 that may be read and executed by host processor 102. Navigation module 120 may employ a reference-based strategy, a self-contained strategy, or any combination of strategies to provide any desired degree of location awareness capabilities. For example, navigation module 120 may employ inertial navigation techniques utilizing sensor data, such as from inertial sensor 112 and/or external sensor 114, to derive a navigation solution. Such techniques may involve dead reckoning or the like, and may determine an orientation for device 100, including values such as any roll, pitch, and azimuth (heading) angles. Navigation module 120 may also use a source of absolute navigation information 122, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning. Bluetooth™ positioning beacons or other similar methods when deriving a navigation solution. Navigation module 120 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Still further, navigation module 120 may also be configured to determine a motion mode that indicates the user's motion patterns, which may include without limitation, walking, driving, running, going up/down stairs, riding an elevator, walking/standing on an escalator, and other similar motion patterns.

Similarly, map module 124 may also be implemented as a set of suitable instructions stored in memory 104 that may be read and executed by host processor 102. As will be described in further detail below, map module 124 may include position estimator 126, hypothesis analyzer 128 and map handler 130. Position estimator 126 may use a navigation solution provided by navigation module 120 to estimate position information for portable device 100. The estimated position information may also be updated using information from hypothesis analyzer 128, which may be configured to generate, evaluate and combine multiple hypotheses regarding possible positions of portable device 100 using the estimated position and information from map handler 130. Correspondingly, map handler 130 may be configured to access external information regarding an area encompassing a current location of portable device 100 and present the information in a form usable by hypothesis analyzer 128. By processing the generated hypotheses, such as combining using appropriate weighting and averaging, electing a selected hypothesis, electing a group of hypotheses and combining only these using appropriate weighting and averaging, or other suitable operations, the output from hypothesis analyzer 128 may be used by position estimator to update the estimated position information. The estimated position information and/or updated estimated position information may include, in addition to position information, velocity and/or heading information, as well as any other information related to the motion or position of device 100, and may also include map entity information. The updated estimated position may then be used as an enhanced navigation solution or may be fed back to navigation module 120 for use in deriving an enhanced navigation solution. In some embodiments, values from the updated estimated position information and the navigation solution may be used in the enhanced navigation solution.

Other embodiments may feature any desired division of processing between host processor 102, MPU 106 and other resources provided by device 100, or may be implemented using any desired combination of software, hardware and firmware. Alternatively or in addition, any of the operations associated with map module 124 may be performed remotely, with the results returned to portable device 100 for enhancing the navigation solution. Whether performed remotely or locally, the updated estimated position information represents a determination of position information indicating a position for portable device 100 for contemporaneous use. Although some transmission, some possible buffering, and processing time may be required, the results are at least near real time (there could be some possible latencies) and may use any information available up until the time the estimated position information is updated. As such, multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and MPU 106, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, a dedicated processor or any other processing resources of device 100, or remote processing resources.

Figure 2:
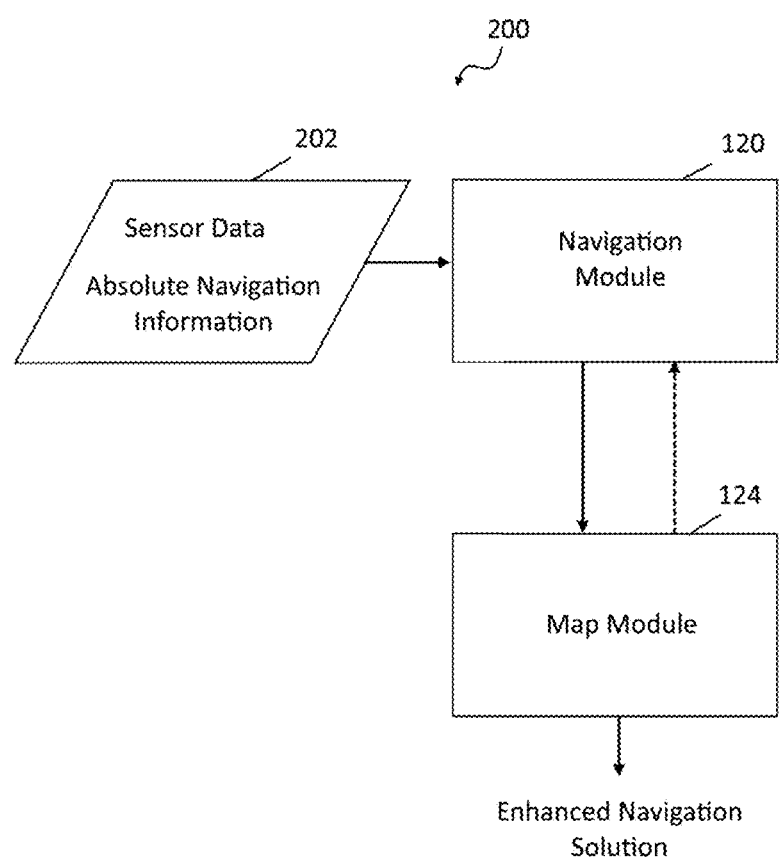
FIG. 2 is a schematic representation of an exemplary architecture for enhancing a navigation solution according to an embodiment.

To illustrate exemplary embodiments, a first architecture 200 for providing an enhanced navigation solution for portable device 100 is shown schematically in FIG. 2. Sensor data, such as from inertial sensor 112, external sensor 114 and/or auxiliary sensor 116 may be provided as an input 202 to navigation module 120. Absolute navigation information, such as from 122, may also be provided if or when available to generate an integrated navigation solution. In turn, map module 124 uses information from the navigation solution, which may include position, velocity and/or attitude estimates and may also include a motion mode of the user as determined by navigation module 120, along with map information as described herein to output an enhanced navigation solution. Optionally, as indicated, the enhanced navigation solution may be fed back to navigation module 120 for use in deriving subsequent navigation solutions. The feedback to navigation module 120 may include position, velocity and/or heading information that has been enhanced with the map information and may also include current map entity information that correlates the position of the device to a reference object or feature from the map. The feedback information may be used to further improve performance of the integrated navigation solution.

Figure 3:
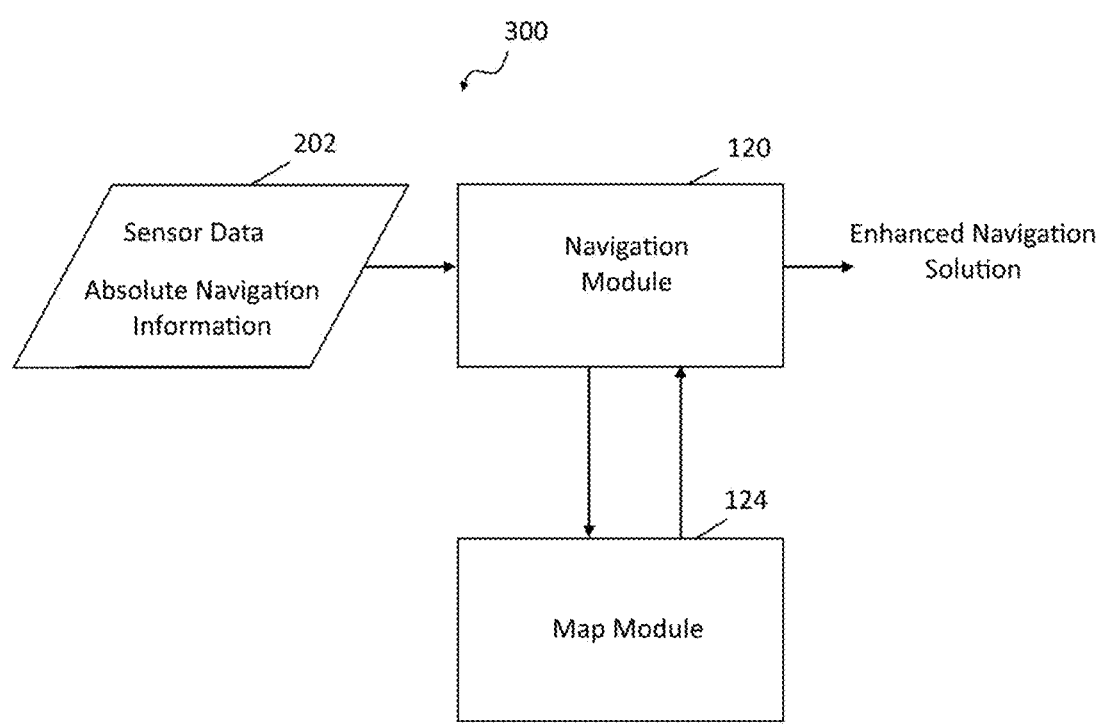
FIG. 3 is a schematic representation of another exemplary architecture for enhancing a navigation solution according to an embodiment.

A second architecture 300 for providing an enhanced navigation solution for portable device 100 is shown schematically in FIG. 3. Again, sensor data, such as from inertial sensor 112, external sensor 114 and/or auxiliary sensor 116 may be provided as an input 202 to navigation module 120. Likewise, absolute navigation information, such as from 122, may also be provided if or when available to generate an integrated navigation solution. In turn, map module 124 receives inputs as described above from the navigation solution along with map information to output an updated estimated position that is fed back to navigation module 120 as indicated. Again, the feedback to navigation module 120 may include position, velocity and/or heading information that has been enhanced with the map information and may also include current map entity information. Thus, navigation module 120 outputs the enhanced navigation solution in this embodiment. The feedback information also may be used to further improve performance of the integrated navigation solution in subsequent derivations.

Figure 4:
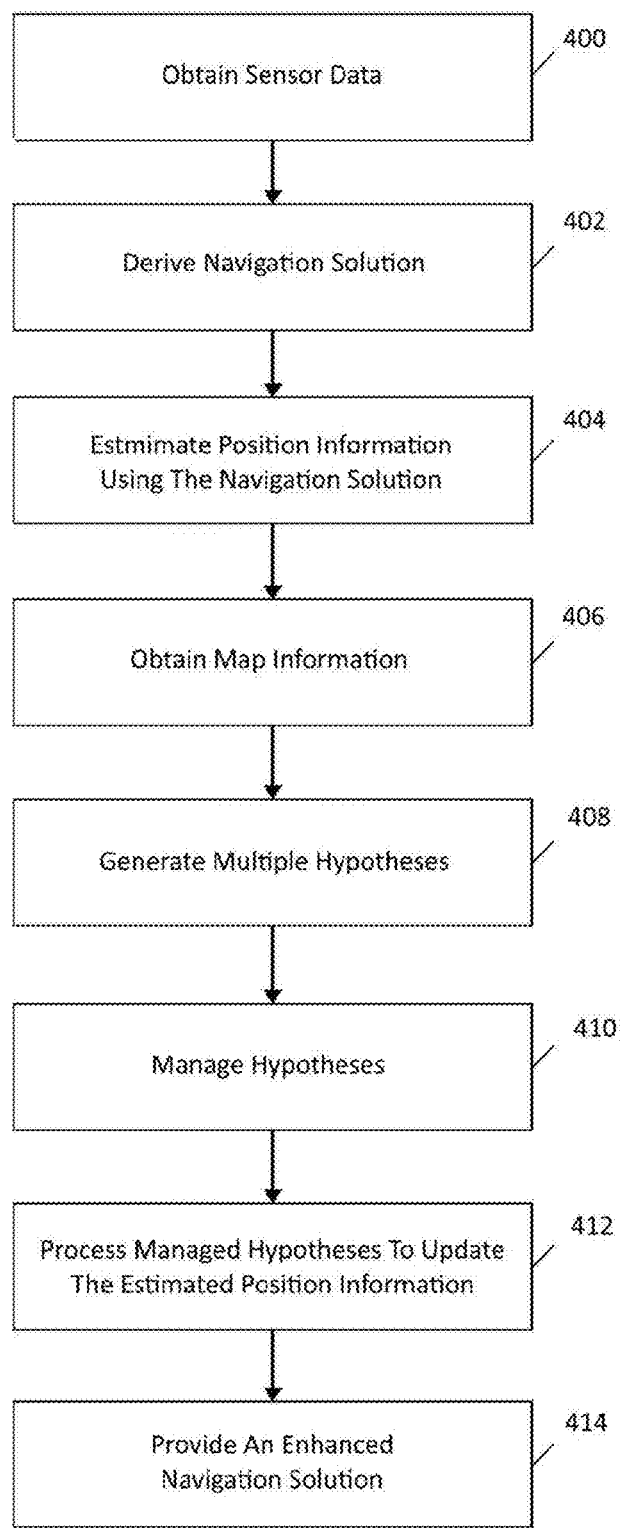
FIG. 4 is a flowchart of a routine for enhancing a navigation solution according to an embodiment.

To help illustrate the techniques of this disclosure, a representative routine is depicted in FIG. 4. Beginning with 400, sensor data may be obtained, such as from inertial sensor 112 and/or external sensor 114, for the portable device. Using the sensor data, navigation module 120 may derive a navigation solution in 402. Position information for portable device 100 may be estimated in 404 and map information for a surrounding area may be obtained in 406. Multiple hypotheses may be generated in 408 from the estimated position information and the map information. Next, in 410, the generated hypotheses are managed as described herein and then processed in 412 to update the estimated position information. An enhanced navigation solution may then be provided in 414.

In one aspect, the updated estimated position information may be used itself as the enhanced navigation solution. The updated estimated position information may be fed to the navigation solution to derive an enhanced navigation solution. The deriving of the enhanced navigation solution may utilize the updated estimated position information as a measurement update to the navigation module. Another option is that the enhanced navigation solution may include values from the navigation solution and the updated position information.

In one aspect, absolute navigation information may be obtained for the portable device and the navigation solution may be derived based on the absolute navigation information. The absolute navigation information may be obtained from any one or any combination of the following: (i) a global navigation satellite system (GNSS); (ii) cell-based positioning; (iii) WiFi-based positioning; or (iv) other wireless-based positioning.

In one aspect, generating multiple hypotheses regarding possible positions of the portable device may be further based on updated position information from a previous epoch.

In one aspect, the map information may be preprocessed. Preprocessing the map information may include extracting map entities. Preprocessing the map information may also include clipping at least one foreground map entity from a background entity. For example, clipping the background entity may define a traversable area. Preprocessing the map information further may also include representing a map entity as a relatively complex polygon and decomposing the polygon into a plurality of relatively more simple polygons. Still further, preprocessing the map information may include generating a grid of connected links and nodes.

In one aspect, the estimated position information may be an error region representing potential positions of the portable device. At least one of the hypotheses may be generated by projecting the error region onto the map information. A plurality of hypotheses may be generated by projecting the error region onto the map information when an overlap with a plurality of map entities occurs. The map information may include a polygon based geometric map and/or a grid map.

In one aspect, the map information may include a grid map and the estimated position information may be based at least in part on a correlation between a determined user trajectory and geometric and/or topological features of the grid map.

In one aspect, managing the hypotheses may include at least one of adding, eliminating and combining hypotheses.

In one aspect, managing the hypotheses may include applying a decision making logic. The decision making logic may be configured for a wall crossing event and/or a level change event.

In one aspect, the navigation solution may be a motion mode for the user. The estimated position information may be based at least in part on the motion mode, the hypotheses may be managed based at least in part on the motion mode and/or a level change event may be based at least in part on the motion mode.

In one aspect, the enhanced navigation solution may be a motion mode for the user detected based at least in part on a map entity associated with the estimated position information.

In one aspect, position information for the portable device may be estimated using at least one of a prediction only Kalman filter, a near constant velocity Kalman filter, a prediction only particle filter and a near constant velocity particle filter.

In one aspect, at least one of obtaining map information, generating multiple hypotheses, managing the hypotheses, and processing the managed hypotheses to update the estimated position information for the portable device may be performed remotely.

As described above, a portable device, such as portable device 100 may provide an enhanced navigation solution using map information.

In one aspect, the device may include a source of absolute navigation information for the portable sensor device and the absolute navigation information may aid the navigation solution. The absolute navigation information may be obtained from any one or any combination of the following: (i) a global navigation satellite system (GNSS); (ii) cell-based positioning: (iii) WiFi-based positioning: or (iv) other wireless-based positioning.

In one aspect, the map module provides an enhanced navigation solution, wherein the updated estimated information may be the enhanced navigation solution.

In one aspect, the updated estimated position information may be fed to the navigation module, wherein the navigation module may enhance the navigation solution using the updated estimated position information. Enhancing the navigation solution may utilize the updated estimated position information as a measurement update to the navigation module.

In one aspect, the map module may provide an enhanced navigation solution, wherein the enhanced navigation solution includes values from the updated estimated information and the navigation solution.

In one aspect, the sensor assembly may include an accelerometer and a gyroscope. The sensor assembly may be an inertial sensor implemented as a Micro Electro Mechanical System (MEMS).

Figure 5:
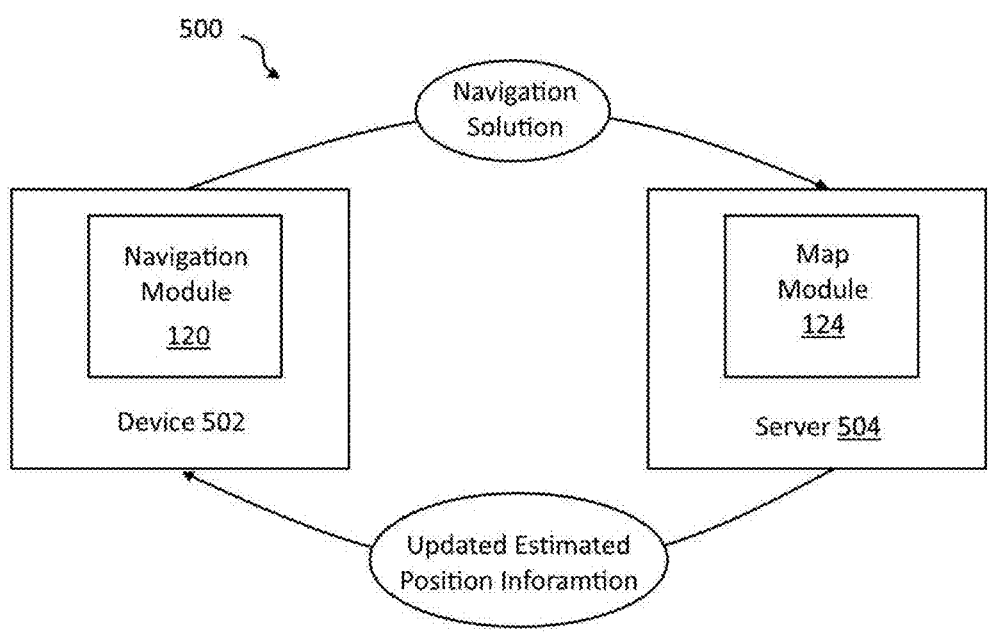
FIG. 5 is schematic diagram of a system for enhancing a navigation solution according to an embodiment.

In some embodiments, the functions described as being performed by map module 124 may be performed remotely. To help illustrate, one architecture of a suitable navigation system 500 is schematically depicted in FIG. 5. As shown, portable device 502 may implement navigation module 120 to employ sensor data for device 502, and optionally absolute navigation information, to derive an integrated navigation solution. The navigation solution, which may include position, velocity and/or attitude estimates and may also include a motion mode of the user, may be transmitted to suitable remote processing resources, such as server 504. Server 504 may then implement map module 124, including any or all of the functions described above, to update estimated position information for portable device 502. Server 504 then transmits the updated estimated position information to portable device 502 for any suitable use. The updated estimated position information fed back to portable device 502 may include any suitable information, including, without limitation, information regarding one or more map entities and/or heading information.

In one aspect, the device provides an enhanced navigation solution, wherein the updated estimated information may be the enhanced navigation solution.

In one aspect, the updated estimated position information may be fed to the navigation module, wherein the navigation module may enhance the navigation solution using the updated estimated position information. Enhancing the navigation solution may utilize the updated estimated position information as a measurement update to the navigation module.

In one aspect, the device is further may provide an enhanced navigation solution, wherein the enhanced navigation solution includes values from the updated estimated information and the navigation solution.

EXAMPLES

As described above, the techniques of the disclosure involve providing an enhanced navigation solution using map information. An exemplary architecture 600 showing a suitable relationship between map module 124 and navigation module 120 is shown schematically in FIG. 6. The functions of map module 124 may be implemented by portable device 100, or may be provided by remote processing resources, such as a server. Navigation module 120 may use a filter to integrate raw measurements from multiple motion sensors, for example accelerometers, gyroscopes, magnetometers, and barometers, together with the position, velocity and/or heading updates from any source of absolute navigation information to generate continuous positioning and motion mode information. This information is provided as inputs to position estimator 126 of navigation module 120 as shown. Position estimator may utilize the information from navigation module 120 as well as results from hypothesis analyzer 128 to generate improved map matched positioning estimates. Hypothesis analyzer 128 uses these position estimates to create, eliminate or combine hypotheses for the next epoch. Position estimator 126 maintains all the possible map matched candidates and generates their corresponding positioning estimates. Position estimator 126 may use any one or combination of filters to obtain the position estimates, including without limitation Kalman filters, unscented Kalman filters, particle filters and the like. Different system and measurement models can be also used according to the applications, for example: prediction only, near constant velocity and others. These models may employ different techniques to propagate the position of portable device 100 and to use navigation solution outputs as measurement updates. Representative system and measurement models are described in the following materials, but other variations may be employed. Position estimator 126 may output an updated position, which may also include velocity and/or heading information that is a combination of the hypotheses. For example, the combination may be a weighted average. The weights used in combining the hypotheses may be adaptively tuned according to the empirical or topological models. For example, the weighting can be adjusted based on the number of hypotheses and/or uncertainty of the position estimates. The updated position from the combination of hypotheses represents map aided information and may be used by map module 124 and/or navigation module 120 to provide an enhanced navigation solution. A current map entity may also be fed back to navigation module 120 for use in deriving the enhanced navigation solution, depending upon the implementation. Feedback to navigation module 120 may also be employed to improve bias estimation for the gyroscopes and misalignment angle between the device and the platform in the navigation filter. Furthermore, the user's current map entity information is also beneficial to improve the motion detection in the navigation solution. For example, if it can be determined that the user is on stairs, patterns of corresponding sensor data may be associated with that motion mode.

Map information may initially be obtained from any suitable source, such as from on-line map service providers. A necessary, the map information may be preprocessed into a form suitable for use by map module 124. For example, the map information may be converted into an internal map data structure, where it may be saved into the local storage for future use by map module 124 without the overhead of downloading and processing it again if desired. Accordingly, preprocessing the map information may include the functions of i) converting map information from various map data providers to a unified data structure, ii) preparing the necessary map data structure suitable for map aided algorithms, and/or iii) storing the map information in local storage, such as memory 104, On-line indoor/outdoor map service providers may provide web Application Programming Interfaces (APIs) to access their map database. Accordingly, the corresponding APIs from the map provider may be used to obtain map information for an area encompassing the user's current location. Particularly notable examples of venues that may have corresponding map information include indoor environments such as office buildings, hospitals, malls, conference centers exhibitions, retail stores and the like. This map information may be preprocessed to facilitate its use by map module 124. For example, the information may be decoded to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use by map module 124. Generally, it is desirable to minimize the number of times preprocessing operations are performed for each venue. For example, the map information may be appropriately formatted for a given venue once and distributed to any number of portable devices to be used in the generation of hypotheses for enhancing a navigation solution within that venue. However, another preprocessing operation may be performed when new information becomes available or when changes to the venue occur.

Furthermore, preprocessing the map information may include segregating it into traversable and non-traversable regions. For example, corridors represent an important class of traversable regions in typical indoor environments. As such, a corridor clipping function may be performed to extract corridor shape information from background entities if the corridor information is not available to present the map information as a polygon based geometric map. Many conventional map service providers do not offer corridor shape information which is important in an indoor map aided algorithm. Therefore, a suitable technique for obtaining the shape of corridors that may be present in the venue may include extracting all the other entities from the background entity. The background entity may be a boundary contour that establishes a given building or level of a building or other venue. Foreground entities include all objects such as shops, elevators, escalators, and other obstacles within the boundary contour. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 7:
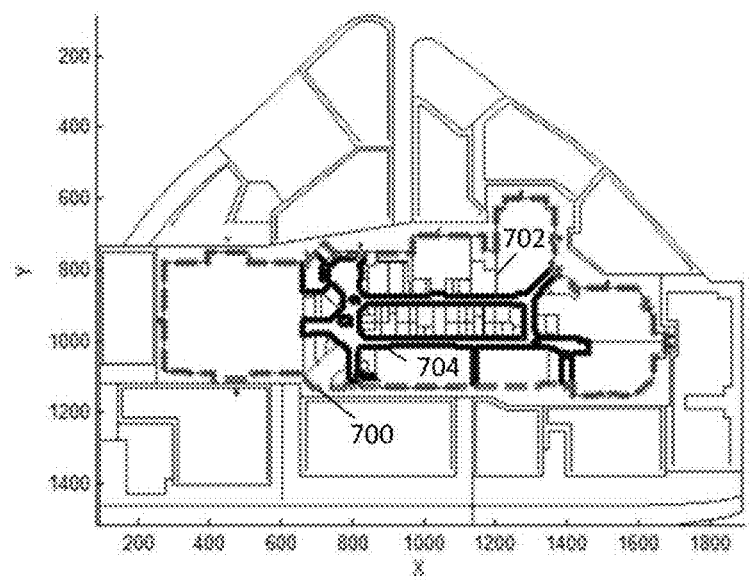
FIG. 7 is a schematic representation of map entity clipping in a geometric map according to an embodiment.

After iteratively clipping all the other entities from the background, the corridor polygon may be obtained. A suitable clipping algorithms may be configured to accommodate relatively complex polygons with holes, for example, the Vatti clipping algorithm. An illustration of the results of a clipping algorithm are shown in FIG. 7 for a representative polygon based geometric indoor map. The background entity 700 for a portion of the map is represented by a dashed line. Foreground entities represented as polygons with fine lines, such as polygon 702 (the other are not labeled to preserve clarity), are clipped on top of background entity 700. The resulting polygon 704, represented by the heavy line, gives the shape of the corridor. The resulting corridor shape may be represented by a complex polygon. A complex polygon used herein is a polygon (without self-intersection) which has one or multiple holes inside.

As will be described below, some map entities may provide inherent position information, such as elevators, escalators, stairs that may be associated with level change scenarios or conveyors that may allow the assumption of heading or other position information. The locations of the entrances and exits to the background map entity, as well as doors or other entrances/exits to foreground entities may also be used. Still further, the direction of the entrances/exits may also be used when generating hypotheses. In a multi-level venue, the height of each level may be used with sensor information indicating changes in elevation to help determine when a level change scenario may exist.

In addition, preprocessing may include decomposing one or more shapes of the map entities into small simpler polygons to improve the computation efficiency when used by map module 124. A trapezoid decomposition may be used to depose relatively complex polygons into more simple trapezoids, while a convex decomposition may be used to partition relatively complex polygons into more simple convex polygons. An optimal decomposition algorithms may be applied to generate a reduced number of polygons after the decomposition process. Any one or combination of decomposition methods may be employed.

Figure 8:
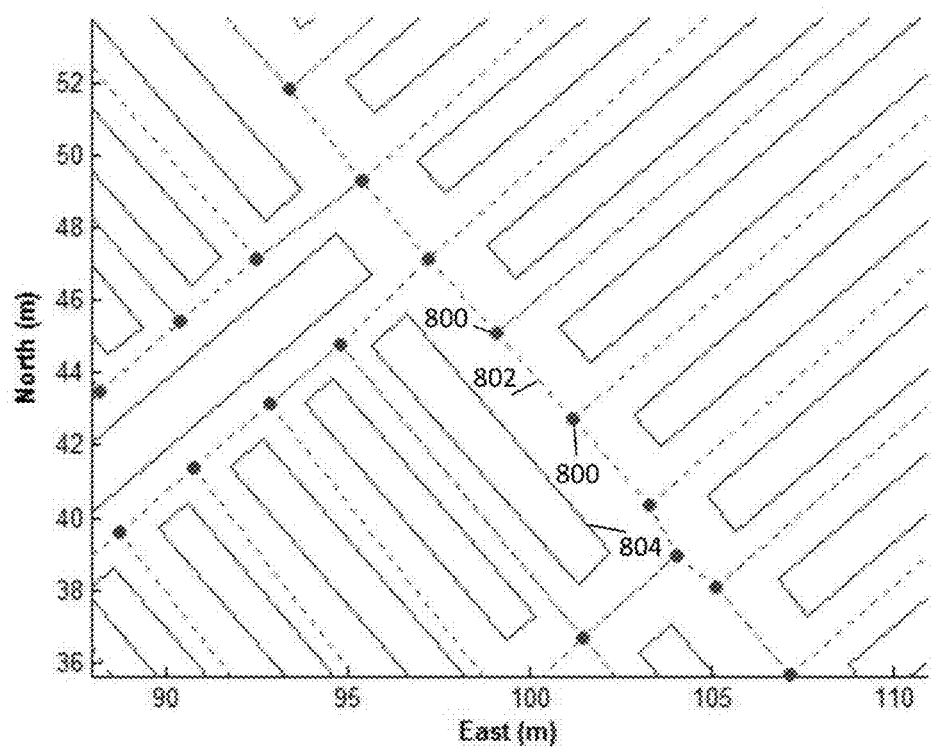
FIG. 8 is a schematic representation of grid map according to an embodiment.

Preprocessing the map information may also include abstracting the traversable areas of the indoor maps with connected links and nodes. Connected links and nodes may contain both the geometric and the topological information of the map. Therefore, the map module 124 may benefit from the topological information to improve generation of the updated estimated position information. As used here, a map constructed from the connected links and nodes may be termed a grid map. Any suitable technique may be used to generate the grid map, such as for example by using a voronoi diagram with possibly some other processing. Another example to generate grid map is by using the geometry of the traversable and non-traversable areas from the map directly together with possibly some of the map entity types. An example grid map is illustrated in FIG. 8. As shown, dots may be used to represent the map nodes, such as dots 800. The dashed lines represent the connected links, such as link 802 between dots 800, and the map entities are represented by the solid polygons, such as 804. A node is the point on the map which has the equal distance to its closest three or more map entities. As with the polygon based geometric maps, the grid map can be preprocessed offline by external processing resources and saved in a map file for subsequent use by map module 124 without the need for preprocessing each time updated estimated position information is determined.

Both the polygon based geometric map and grid map can be applied to improve the reliability and the accuracy of the updated estimated position information provided by map module 124. For example, a retail store map can be readily divided into structured areas and non-structured areas. At those non-structured areas such as open spaces, isolated booths and the like, geometric based techniques described above may be applied. Alternatively or in addition, at structured areas such as aligned shelves or booths, map module 124 may employ the geometric and topological information represented by a gird map.

Accordingly, map handler 130 of map module 124 may function to load previously stored, preprocessed map information, which may include clipped and decomposed map information together with the original map information as described above. Map handler 130 may access map information that is already formatted in a manner to facilitate the generation of position hypotheses for portable device 100 and may retrieve the information as needed. From the preprocessed map information, map handler 130 initializes the internal map data structure, which may include the map projection parameters, geometric shapes, identifications (IDs) and type information of all the entities in the map. The projection parameters, for example the six-parameter affine transformation, can be used to transform between the coordinates in the map and in the latitude and longitude. The entity types describe the functions of the particular entities such as background, unit, escalator, elevator, stairs and etc. Both the shape and type information may be used by hypotheses analyzer 128. Map handler 130 may also organize the map geometric information in a spatial database so that an efficient search algorithm may be applied to query a point of interest or range of interest in the map. For example, an R-tree structure may be used for efficient and fast search of map entities. As will be appreciated, an R-tree search algorithm may locate a given point in the map and return a pointer to the corresponding map entity.

Although described in the context of being performed by external processing resources, any or all of the functions associated with preprocessing map information may be performed by map handler 130 as desired.

Figure 6:
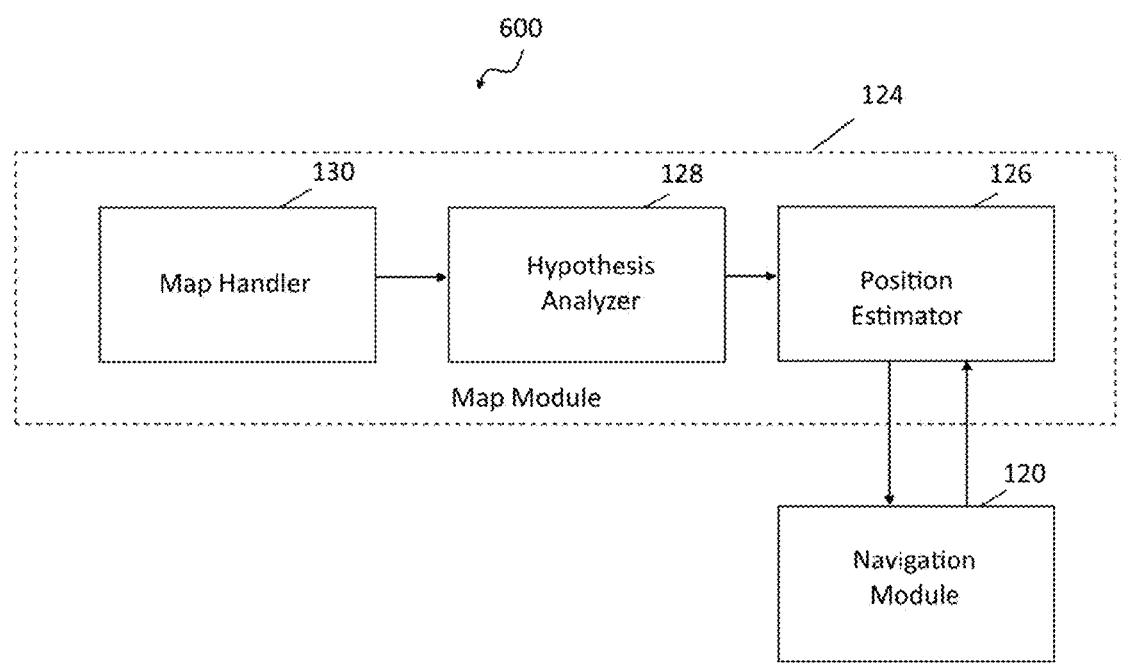
FIG. 6 is a schematic representation of a map module for use in enhancing a navigation solution according to an embodiment.

As indicated by FIG. 6, outputs from both position estimator 126 and map handler 130 are feed into hypothesis analyzer 128. Notably, position estimator 126 may provide estimated position information in the form of position and variance estimates used to define an error region. Hypothesis analyzer 128 superimposes or projects the error region on the processed map to identify the possible entities in which the user is travelling. Hypothesis analyzer 128 maintains, creates, eliminates and combines the hypotheses based on any suitable decision making logics, including those described below. Hypothesis analyzer 128 may also assign weights for all currently available hypotheses based on topological and empirical information. Those weights can be used to combine or eliminate hypotheses as well as to combine the hypotheses, such as by generating a weighted average to update the estimated position.

Hypothesis analyzer 128 as noted maintains, creates, deletes and combines hypotheses. A hypothesis refers to a possible location of user with any desired corresponding attributes, such as position, velocity, heading, motion mode, position variance, occupied map entity and the like. The decision making logic applied to the various hypotheses may be selected based on the user operational scenarios as indicated in the following examples.

Many implementations of a decision making logic for hypothesis management employ the concept of an error region. As will be appreciated, the error region represents an uncertainty of the possible position(s) of portable device 100 determined by position estimator 126. As desired, an error region may define a rectangle, a circle, an ellipse, an arbitrary polygon or any other shape. If the Kalman filter is used with position estimator 126, an "error ellipse" may be used. The parameters of an error ellipse include the semi-major axis length (a) and semi-minor axis length (h), and orientation (a) may be derived from the covariance matrix of the Kalman filter and the predefined confidence level. For example, a 95% confidence level may be used to reasonably cover the position uncertainty, although other values may be employed depending on the desired performance characteristics. Correspondingly, the error ellipse parameters may be given by Equation (1):

$$a = \sqrt{5.991\lambda_1}$$
$$b = \sqrt{5.991\lambda_2}$$
$$\alpha = \tan^{-1} \frac{v_1(y)}{v_1(x)}$$

(1)

where $\lambda_1$ and $\lambda_2$ represent the eigenvalues of the covariance matrix and $v_1$ represents the eigenvector of the covariance matrix with the largest eigenvalue. In order to reduce the computation load, the error ellipse may be approximated by a polygon with several vertices, such as 32 vertices, evenly distributed around the edge of the ellipse.

Figure 9:
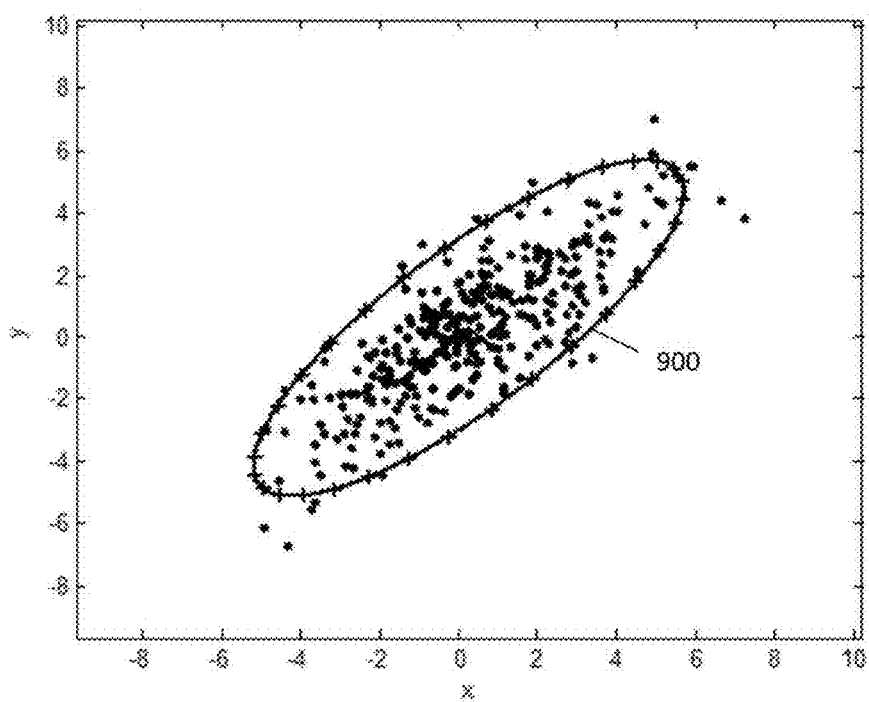
FIG. 9 is a schematic representation of an error ellipse for use in generating hypotheses according to an embodiment.

If the particle filter is used, the samples of the position estimates approximate the error region. However, the error ellipse or other region is still required in hypothesis analyzer 128 to combine and eliminate hypotheses. Therefore, the covariance matrix may be derived from the position sample data. Then the parameters of the error ellipse may be calculated as in the Kalman filter mode. To illustrate. FIG. 9 shows an example of an error ellipse derived from a particle filter using 95% confidence level. The "+" symbols indicate the vertices of the approximated error ellipse 900.

Figure 10:
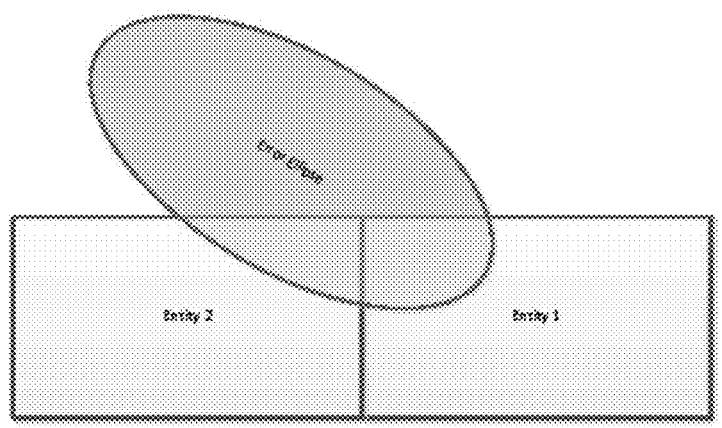
FIG. 10 is a schematic representation of an error ellipse projected onto map entities according to an embodiment.

In reference to the context of an error region, various decision making logic approaches may be applied for managing the hypotheses. A first example corresponds to a scenario with a wall crossing event. Each hypothesis may have its own occupation field to indicate the current map entity associated with portable device 100. As shown in FIG. 10, position estimator 126 uses the error region superimposed on the map layout to obtain the candidate hypotheses. If no overlapping area between the error region and map entities other than the currently occupied entity is detected, hypothesis analyzer 128 need not perform any further operations. However, when the error region intersects with multiple map entities, the attributes of the intersected entities are inserted into an intersection table. The overlapping detection can be fulfilled by iteratively checking the location of vertices from the approximate polygon for the error ellipse. The spatial search algorithm, for example, an R-tree search and point-in-polygon algorithms, may be applied to find the map entity for each vertex of the error ellipse. If all the vertices are on the same map entity as the current hypothesis's occupation, no overlapping is declared. Otherwise, a new hypothesis candidate will be added to the intersection list. It is noted that each hypothesis maintains its own intersection list. The current hypothesis may be called the parent hypothesis whereas all the candidate hypotheses may be called children hypotheses.

If the intersection area is over a suitable threshold, such as approximately 10% of the total area of the error ellipse, the new hypothesis candidate may be subjected to further analysis, otherwise it will be removed from the intersection list. Hypothesis analyzer 128 may then analyze all the candidates in the intersection list different than the occupation of the current hypothesis. The initial position of the new candidate hypothesis is given by the current position estimate from position estimator 126. However, if this point is not in the range of the overlapping polygon, the centroidal moments of the overlapping polygon may be used as the initial position of new hypothesis instead.

Figure 11:
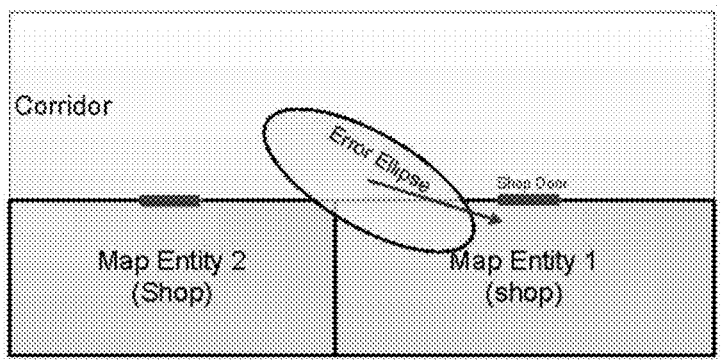
FIG. 11 is a schematic representation of an error ellipse in a corridor scenario with door information according to an embodiment.

Subsequently, a wall crossing detection may be performed. The logics of the wall crossing event are based on whether the room door information is available. If door information is available, the algorithm may evaluate the distance between the candidate hypothesis's initial position and the door's position as schematically indicated in FIG. 11. If the distance is within a predefined threshold, such as 2 meters, a wall crossing event may be declared. The center position of the room door may then be used as the initial position of the new candidate hypothesis. Next, a validation check may be performed to determine whether the initial point of the new hypothesis is within the range of other current available hypotheses. Subsequent operations may be adjusted depending on the particular implementation. When using a particle filter, for example, a new hypothesis may be created with all the particles residing in the new map entity and added to the hypothesis list. All other attributes, except the position of the newly created hypothesis, may be inherited from the parent hypothesis. When using a Kalman filter, for example, no new hypothesis creation and/or eliminate are performed and the position and occupation fields of the parent hypothesis may be updated.

Figure 12:
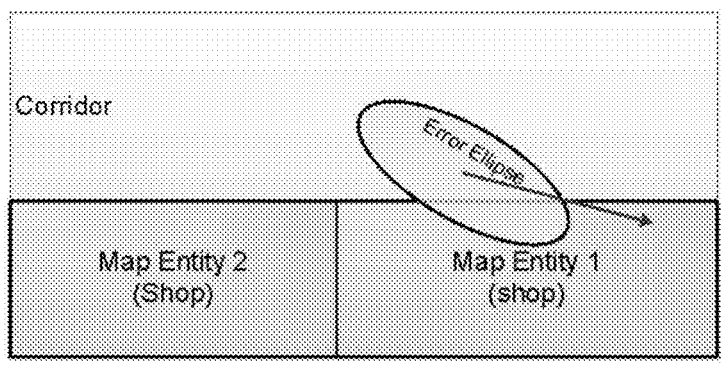
FIG. 12 is a schematic representation of an error ellipse in a corridor scenario without door information according to an embodiment.

If the room door information is not available, the angle between the intersection edge of the error ellipse and the map entity of the interest, and the user's heading may indicate the possibility the user may enter into the new entity as schematically indicated in FIG. 12. If the heading of the current hypothesis is nearly parallel to the edge of the room, this intersection may result from a skewed navigation solution. In this case, if the overlapping area is above a suitable value, such as approximately 45%, a new hypothesis with an offset of a predefined amount, such as approximately 0.5 meter, from the intersection point is created and the parent hypothesis is deleted. On the other hand, if the overlapping area is below the predefined amount (and optionally if the yaw dynamics of the user are small), the orientation of the intersection edge may be used to update the heading of the parent hypothesis. If the heading of the current hypothesis is approximately perpendicular to the edge of the wall, a possible wall-crossing event is declared. Correspondingly, a similar process as when room door information is available may be performed.

Hypothesis analyzer 128 also checks the transition of the occupations of hypotheses. It is assumed that a user can freely enter and exit a corridor. However, between-unit crossing is prohibited or assigned with minimum weight to reflect the fact that it is uncommon to have doors between shops. In addition, hypothesis analyzer 128 may also assign the weights of hypotheses based on this transition model or empirical model.

Another exemplary decision logic for managing hypotheses may be applied when a level change event occurs. If a user goes up or down stairs, takes an elevator or escalator, navigation module 120 may perform a routine to detect a corresponding motion mode and/or context indicator to identify the current user motion mode/context (such as elevator, stairs, walking, walking on escalator, or standing on escalator). When a level change event is detected, hypotheses analyzer 128 may use a current navigation solution to search for map entities in the map information, such as stairs, elevator or escalator entrances, that are sufficiently nearby according to the detected mode. For example, if an elevator mode is detected from the navigation solution, hypotheses analyzer 128 may search for a nearby elevator entrance on the map. If the entrance is within certain distance from the current user position, hypotheses analyzer 128 may transition from a normal state to a level change state to apply a corresponding decision logic. The distance threshold may be 10 m as a non-limiting example. Further, the selected value can be tuned according to the accuracy of the navigation solution.

In conjunction with detection of a level change event, hypotheses analyzer 128 may transition from a normal state to a level change state to adjust its operation. If desired, a validation process may be performed to avoid a level change false alarm. During the process, hypotheses analyzer 128 may propagate the user position initially using techniques similar to the normal state. The validation process may use a height difference between the current epoch and the epoch when entering the level change state as the metric to verify change in state. If within a certain time, detection of a height difference above a threshold, such as 2.0 m as a non-limiting example, the transition to level change state may be validated. Otherwise, the detection may be treated as a false alarm, resulting in a return to the normal state.

Given successful validation of the level change, hypotheses analyzer 128 may eliminate all hypotheses and create a new hypothesis using the identified level change entrance information. The initial position of the hypothesis and/or heading may be established by the entrance position of the corresponding map entity. Map information corresponding to the new level may then be used, such that the new level is identified by as above or below the previous level according to the sign of the height difference. Subsequently, the state of hypotheses analyzer 128 may transition to a finalizing state. If the validation process failed, the state goes back to the normal state.

Figure 13:
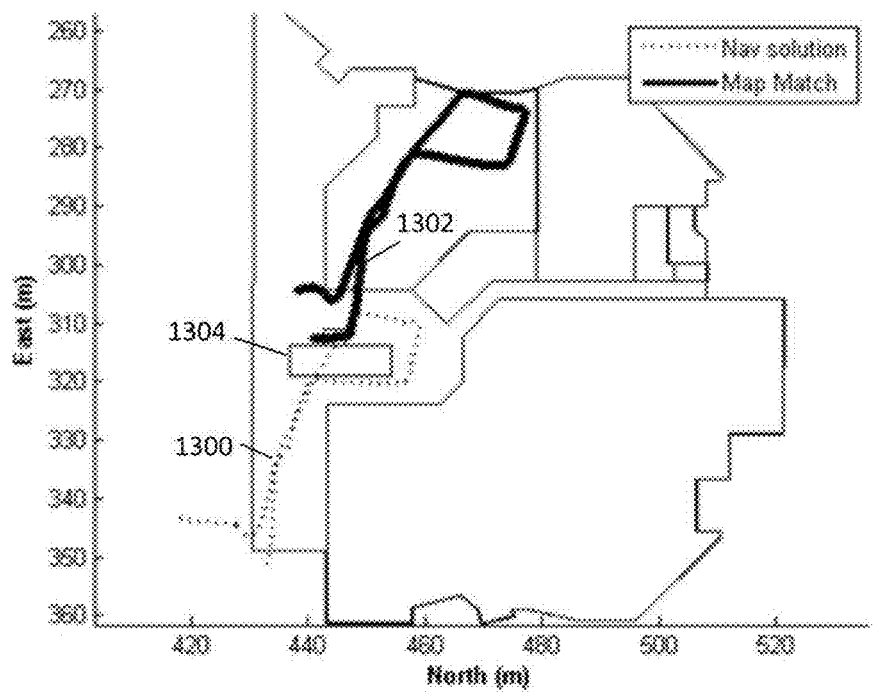
FIG. 13 is a schematic representation comparing navigation solutions in a level change scenario according to an embodiment.

In the finalizing state, hypotheses analyzer 128 may monitor the motion mode provided by navigation module 120. If a walking status is detected, hypotheses analyzer 128 may reset the position of current hypothesis to the exit position of the level change entity and revert to normal state as schematically depicted in FIG. 13. Hypothesis 1300 may correspond to the position estimate provided by the navigation solution, while hypothesis 1302 may reflect the updated position estimate based on the assumption of exiting elevator 1304. Otherwise, hypotheses analyzer 128 may continue propagating the user position. It is noted that the algorithm does not reset the heading of the hypothesis according to the level change entity layout after exiting it. This is because the user heading may already have changed due to the detection delay of the motion mode. As shown in FIG. 13, the door of the elevator is on the right side (00), however, the user heading is around −90° after exiting the elevator.

In addition to the motion modes and/or context awareness scenarios discussed earlier (such as when a user goes up or down stairs, takes elevators or escalators), some other motion modes and/or contexts such as walking or standing on a conveyor (moving walkway), walking near an wireless beacon or other wireless radio frequency (RF) tags and the like may be used to adjust operation of hypothesis analyzer 128. When the system autonomously detects such motion modes or context awareness scenarios, the map information techniques presented herein can relate those to map entities. There are ways to benefit from this such as: (i) navigation module 120 may detect a motion mode/context that relates to a map entity provided by map module 124 and may enhance the navigation solution (particularly position and optionally heading) to the location of the map entity: (ii) navigation module 120 may receive a map entity provided by map module 124 that implies a motion mode and/or context, which may be used to aid recognition of sensor data patterns associated with the implied motion mode.

For example, when navigation module 120 detects a user is walking/standing on a conveyor, hypothesis analyzer 128 may search for a nearby conveyor in the map information. When a nearby conveyor is found, a new hypothesis may be created with the entrance of the conveyor as the initial position and the orientation of the conveyor as the initial heading, eliminating all the other hypotheses. A similar process to that applied regarding a level change event when a user steps out of the conveyor. This context based 2D position adjustment may reduce the accumulated error from PDR and thus improves the performance of navigation module 120. On the other hand, when a hypothesis's error region is on top of a particular map entity such as a conveyor, an elevator or an escalator, before navigation module 120 detects the corresponding motion mode, this information can be fed to navigation module 120 to increase the sensitivity of the particular detection and improve the success rate.

A similar process may be applied to a walking/driving motion mode detection scenario when a user is identified on a parking lot. For example, if the hypothesized position is on top of a parking lot, this information can be fed to the navigation system to improve the sensitivity of the driving/walking detection module.

Another exemplary scenario involves updates from a wireless beacon or RF tags. If the entrance of a shop or information desk is equipped with wireless beacon or RF tags, the portable device may receive the information from these wireless tags when it is sufficiently close. In this case, the position of the shop entrance or information desk can be used to update the position of the hypotheses.

As noted above, position estimator 126 may utilize outputs from navigation module 120 and the results from hypothesis analyzer 128 to generate the improved positioning estimates aided by map information. Hypothesis analyzer 128 uses these position estimates to create, eliminate or combine hypotheses for the next epoch. Also, position estimator 126 generates feedback to navigation module 120. Feedback may include weighed average of positions or headings from all the hypotheses and map entity information. The position and heading feedbacks can improve the gyro bias and misalignment angle estimates and thus increase the positioning accurate. The map entity information, as mentioned above, may improve the success rate and reduce the delay of the motion detection in the navigation solution. The standard deviations of the position and heading can be also be provided as feedback to navigation module 120. The standard deviations can be adaptively tuned according to the empirical or topological models. For example, they can be adjusted based on the number of hypothesis, or uncertainty of the position estimates.

Figure 14:
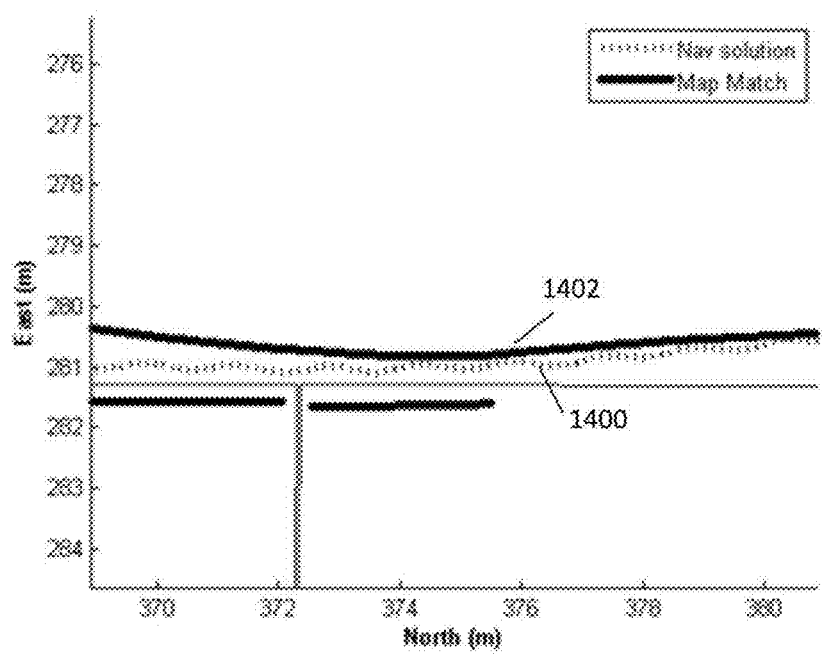
FIG. 14 is a schematic representation comparing navigation solutions following heading oscillation removal according to an embodiment.

The input heading from the navigation solution provided by navigation module 120 may be expected to be the platform heading, and may be derived from the difference between the device heading and an estimated misalignment angle. In some situations, this derived platform heading from the navigation solution may exhibit a periodic heading oscillation, depending on the use case of portable device. The use case is a characterization of the type of interaction between a portable device and the user, and may include whether the user is carrying the device, holding the device with a swinging arm or "dangling," positioning it "on car" when talking, inputting data or viewing in a navigation or texting operation, carrying the device in a pocket or other container or holder, and other usages of the device that affect its orientation with respect to the user. For example, pocket or dangling use cases may have a periodic motion component. In order to remove the periodic oscillation of the platform heading, a low pass filter can be applied. For example a five-order low pass filter with 0.5 Hz cut-off frequency may be employed. An exemplary result of removing heading oscillation is schematically illustrated in FIG. 14, with the results of the navigation solution alone indicated by trace 1400 and the enhanced navigation solution following low pass filtering indicted by trace 1402.

Although described primarily in the context of geometric map information, the above techniques may be used, alternatively or in addition, with map information represented as a grid map. For example, the user position may be projected into the connected links and nodes by using the position-to-curve or curve-to-curve matching. The two techniques may be combined to ease implementation and maintenance. The grid map may also be used to assist the hypothesis analyzer 128 to derive more reliable hypotheses by using a weighed topological algorithm based on the correlation between the trajectory of the user and the topological features of the grid map. Any suitable conditional test or tests may be applied to eliminate segments that do not fulfill pre-defined thresholds, which may be obtained from a statistical analysis of field test data. As with the geometric techniques, when ambiguities exist, multiple hypotheses may be generated to take the user motion uncertainty into consideration. For example, user motion uncertainty may be caused by accumulated step length error, user heading error and others. As such, multiple hypotheses may be running in parallel for a certain period of time. The unlikely hypotheses with low weightings may be removed. Furthermore, with the grid map, an improved hypothesis weighting scheme may be employed by analyzing the hypothesis's topological history. An improved uncertainty estimate may be calculated using the weighted average of all the hypotheses' information. Therefore, a more accurate user position uncertainty estimate may be obtained.

Various filters, motion and/or measurement models may be used to update the position of hypotheses according to the techniques of this disclosure. The four exemplary methods described below employ a prediction only Kalman filter, a near constant velocity Kalman filter, a prediction only particle filter and a near constant velocity particle filter, although other filters and/or models may be employed as desired.

As a first example employing a prediction only Kalman filter, outputs from the integrated navigation solution provided by navigation module 120 may be used to predict system states for all currently available hypotheses. Three states may be used as the system states for each hypothesis, including the position error ($\delta x$, $\delta y$) in the map coordinates and the heading error $\delta \psi$. Further, $dX_n$ represents the system states for the n-th hypothesis, the position and heading error may both be modeled as random walk as indicated by Equation (2):

$$dX_n = [\delta x \, \delta y \, \delta \psi]^T \quad (2)$$

As such, one form of the system models can be derived as shown in Equation (3):

$$\begin{bmatrix} \dot{\delta x} \\ \dot{\delta y} \\ \dot{\delta \psi} \end{bmatrix} = \begin{bmatrix} 0 & 0 & -\sin\psi \cdot L \\ 0 & 0 & \cos\psi \cdot L \\ 0 & 0 & 0 \end{bmatrix} \begin{bmatrix} \delta x \\ \delta y \\ \delta \psi \end{bmatrix} + \begin{bmatrix} \cos\psi \cdot w_L \\ \sin\psi \cdot w_L \\ w_\psi \end{bmatrix} \quad (3)$$

where,
ψ is the user heading;
L is the step length, which can be obtained by calculating the displacement between two positions in adjacent epochs from the navigation solution;
$w_L$ is the driving noise of the step length; and
$w_ψ$ is the driving noise of the heading error.

It is noted that the position and step length may be calculated in the map coordinate frame. The position in latitude and longitude may be transformed into the map frame using affine transformation. The transformation matrix has six parameters, which can be obtained from the imported map data. No measurement update need be used in the prediction only method.

Thus, the propagation of the system states may be given by Equation (4):

$$\begin{bmatrix} \tilde{x}_{k+1} \\ \tilde{y}_{k+1} \\ \tilde{\psi}_{k+1} \end{bmatrix} = \begin{bmatrix} \hat{x}_k + \cos\tilde{\psi}_{k+1} \cdot L_{k+1} \\ \hat{x}_k + \sin\tilde{\psi}_{k+1} \cdot L_{k+1} \\ \hat{\psi}_k + \Delta\psi_{k+1} \end{bmatrix} \quad (4)$$

where, k and k+1 represent two consecutive epochs, the "~" represents the predicted value, and "^" represents the best estimated value, the $\Delta\psi_{k+1}$ represents the heading increment from the integrated solution in the current epoch.

As a second example employing a near constant velocity hypothesis model, outputs from navigation module 120 are used as pseudo measurements to update the system states for all the available hypotheses. The system may be modeled as a velocity random walk. The system states for the n-th hypothesis are the same as those in the prediction only model. The velocity error may be modeled as random walk, random constant or a first-order Gaussian-Markov process. An exemplary system model using velocity random walk is given by Equation (5) as follows:

$$\begin{bmatrix} \delta\dot{x} \\ \delta\dot{y} \\ \delta\ddot{x} \\ \delta\ddot{y} \end{bmatrix} = \begin{bmatrix} 0 & 0 & 1 & 0 \\ 0 & 0 & 0 & 1 \\ 0 & 0 & 0 & 0 \\ 0 & 0 & 0 & 0 \end{bmatrix} \begin{bmatrix} \delta x \\ \delta y \\ \delta\dot{x} \\ \delta\dot{y} \end{bmatrix} + \begin{bmatrix} 0 \\ 0 \\ w_{vx} \\ w_{vy} \end{bmatrix} \quad (5)$$

where,
$\delta\dot{x}$ is the velocity error in the x-direction in the map coordinates;
$\delta\dot{y}$ is the velocity error in the y-direction in the map coordinates:
$w_{vx}$ is the driving noise for the x-axis velocity error;
$w_{vy}$ is the driving noise for the y-axis velocity error.

Correspondingly, the propagation of the system may be given by Equation (6):

$$\begin{bmatrix} \tilde{x}_{k+1} \\ \tilde{y}_{k+1} \\ \tilde{\dot{x}}_{k+1} \\ \tilde{\dot{y}}_{k+1} \end{bmatrix} = \begin{bmatrix} \hat{x}_k + \hat{\dot{x}}_k \\ \hat{y}_k + \hat{\dot{y}}_k \\ \hat{\dot{x}}_k \\ \hat{\dot{y}}_k \end{bmatrix} \quad (6)$$

As will be appreciated, the predicted position may be obtained by the best estimated velocity from the last epoch, and the predicted velocity may be constant from the previous epoch, i.e. a "constant velocity" model.

Since the position from navigation module 120 may be used as the measurement update, the measurement model may be expressed as Equation (7):

$$\delta Z = \begin{bmatrix} \tilde{x} - x_{TPN} \\ \tilde{y} - y_{TPN} \end{bmatrix} = \begin{bmatrix} 1 & 0 & 0 & 0 \\ 0 & 1 & 0 & 0 \end{bmatrix} \begin{bmatrix} \delta x \\ \delta y \\ \delta\dot{x} \\ \delta\dot{y} \end{bmatrix} + \begin{bmatrix} v_x \\ v_y \end{bmatrix} \quad (7)$$

where,
$\delta Z$ is the measurement misclosure;
$\tilde{x}$ and $\tilde{y}$ are the propagated position;
$x_{TPN}$ and $y_{TPN}$ are the projected position updates from the navigation solution: and
$v_x$ and $v_y$ are the measurement noise.

It is noted that the measurement noise may be adaptively tuned based on the position accuracy and the user's dynamics from the navigation solution. For example, when a user is walking in a straight line (small yaw dynamics), the measurement noise can be tuned higher so that the system relies more on the prediction and when turning, the measurement noise may be tuned lower to place more weight on the measurement.

A third example employing a prediction only particle filter may use a set of sample states or particles $\{x_t^{[i]}\}$ to approximate the posterior density functions (pdfs) of the states of interest. Here, each $x_t^{[i]}$ is a concrete state sample for index i ranging from 1 to M, the size of the particle filter. Thus example may be used for non-Gaussian, multi-model pdfs. Its multi-hypothesis nature makes it also suitable for indoor navigation with map aiding. Similar to the Kalman filters, a particle filter also has prediction and update states. The prediction only particle filter need only employ a prediction state.

The state of the prediction only particle filter may be the position and heading of the user. During an initialization process, the M random samples are drawn according to the navigation solution's position and variance. The prediction is performed by the system model as indicated by Equation (8):

$$\begin{bmatrix} x_{k+1}^i \\ y_{k+1}^i \\ \psi_{k+1}^i \end{bmatrix} = \begin{bmatrix} x_k^i \\ y_k^i \\ \psi_k^i \end{bmatrix} + \begin{bmatrix} L_{k+1}\cos\psi_k^i \\ L_{k+1}\sin\psi_k^i \\ \Delta\psi_{k+1} \end{bmatrix} + \begin{bmatrix} v_L^i\cos\psi_k^i \\ v_L^i\sin\psi_k^i \\ v_\psi^i \end{bmatrix} \quad (8)$$

where $v_L$ is the driving noise of step length, which can be modeled as Gaussian noise with the variance of $\sigma_L^2$; and $v_\psi$ is the driving noise of the user heading, which can be also modeled as Gaussian noise with the variance of $\sigma_L^2$.

It is noted that when new hypothesis is created by hypothesis analyzer 128, new samples will be added to the current sample set according to the uncertainty of the created new hypothesis. Similarly, when a particular hypothesis is eliminated, its corresponding samples may be removed from the sample set.

A fourth example employing a near constant velocity particle filter may use a similar concept as the near constant velocity multi-hypothesis Kalman filter, with system states corresponding to the user position and velocity. An exemplary system model is given by Equation (9):

$$\begin{bmatrix} x_{k+1}^j \\ y_{k+1}^j \\ \dot{x}_{k+1}^j \\ \dot{y}_{k+1}^j \end{bmatrix} = \begin{bmatrix} x_k^j \\ y_k^j \\ \dot{x}_k^j \\ \dot{y}_k^j \end{bmatrix} + \begin{bmatrix} \dot{x}_{k+1}^j \\ \dot{y}_{k+1}^j \\ 0 \\ 0 \end{bmatrix} + \begin{bmatrix} 0 \\ 0 \\ w_x^j \\ w_y^j \end{bmatrix} \quad (9)$$

where the driving noise of the velocity can be modeled as Gaussian noise with the variance of $\sigma_v^2$. The measurement equation may be the same as that for the near constant velocity multi-hypothesis Kalman filter.

To help illustrate benefits of the techniques of this disclosure, field tests were performed to evaluate the performance of enhancing a navigation solution with map information. During the field test, smart phones were used in various use cases, including hand-held mode, pocket mode, dangling mode and switching between multiple modes. The test trajectories included a corridor only scenario, a room entering and exiting scenario, and a level change scenario.

Figure 15:
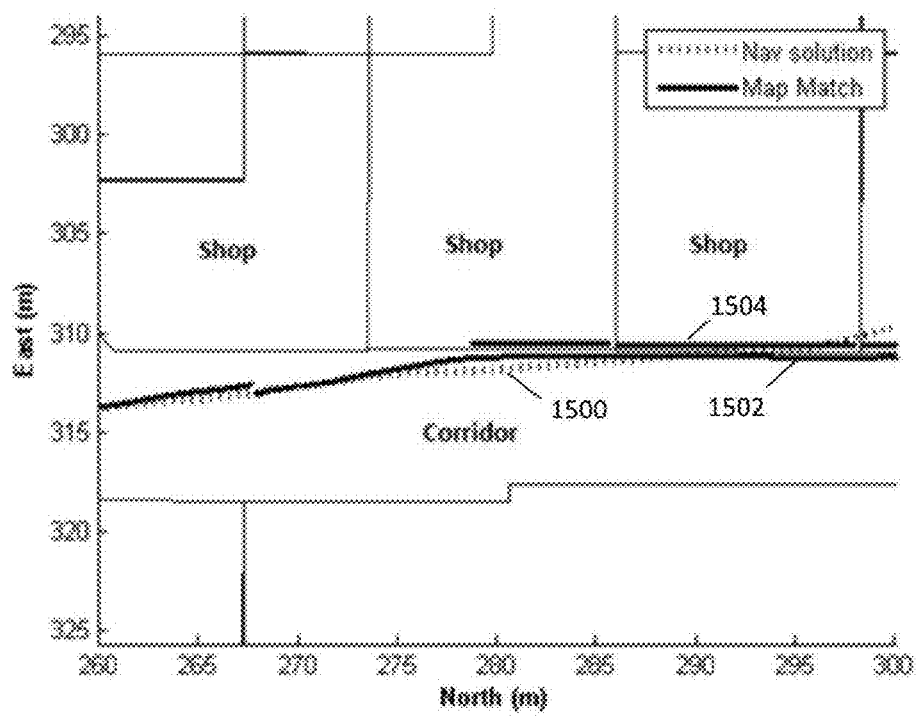
FIG. 15 is a schematic representation comparing multiple hypotheses along a straight corridor wall according to an embodiment.
Figure 16:
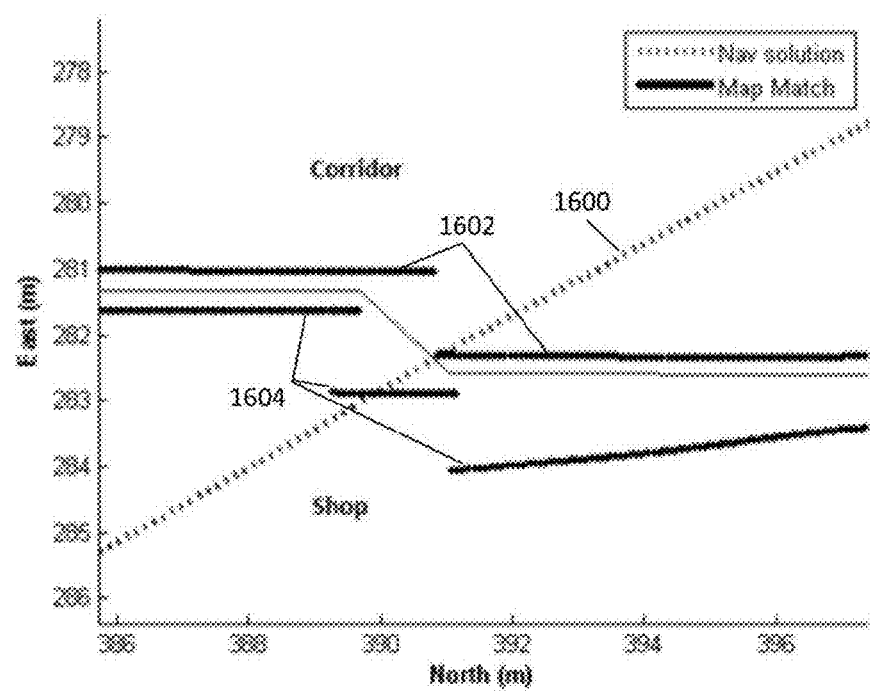
FIG. 16 is a schematic representation comparing multiple hypotheses along an L-shaped corridor wall according to an embodiment.
Figure 17:
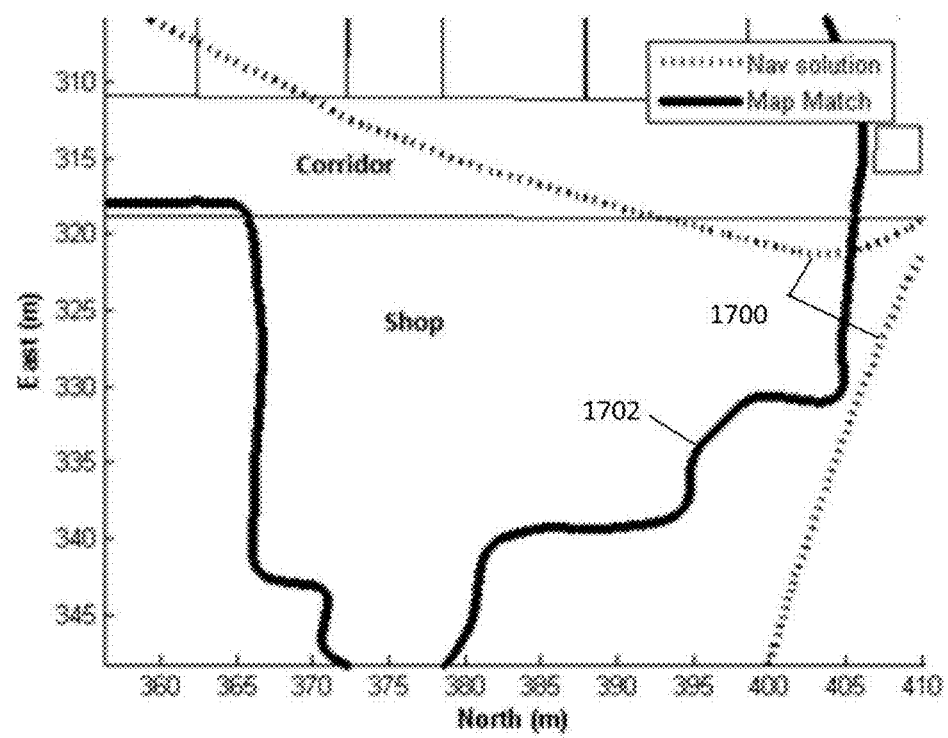
FIG. 17 is a schematic representation comparing multiple hypotheses in a wall crossing scenario according to an embodiment.

As shown in FIG. 15, results of an exemplary multiple hypotheses corridor only scenario were generated along the walls of shops in the mall, with the results of the navigation solution alone indicated by trace 1500 and candidate hypotheses indicted by traces 1502 and 1504. Due to the relatively small angle between the user heading and the intersection edge, no wall-crossing events were declared. Both of the hypotheses travel along the wall. Next, FIG. 16 shows the propagation of hypotheses when a user walks along an "L" shape wall, with the results of the navigation solution alone indicated by trace 1600 and candidate hypotheses indicted by traces 1602 and 1604. A new hypothesis was correctly created with an offset in the map matched solution An exemplary result of a wall crossing event is shown in FIG. 17, with the results of the navigation solution alone indicated by trace 1700 and an enhanced navigation solution indicated by trace 1702. As described above, during a wall crossing event no hypothesis creation or eliminating may be performed in one embodiment. The parent hypothesis only updates its position and map entity field. It is noted that in another embodiment, the parent hypothesis may be eliminated and a new hypotheses created with the new position and map entity field together with inherited other attributes from the parent.

Figure 18:
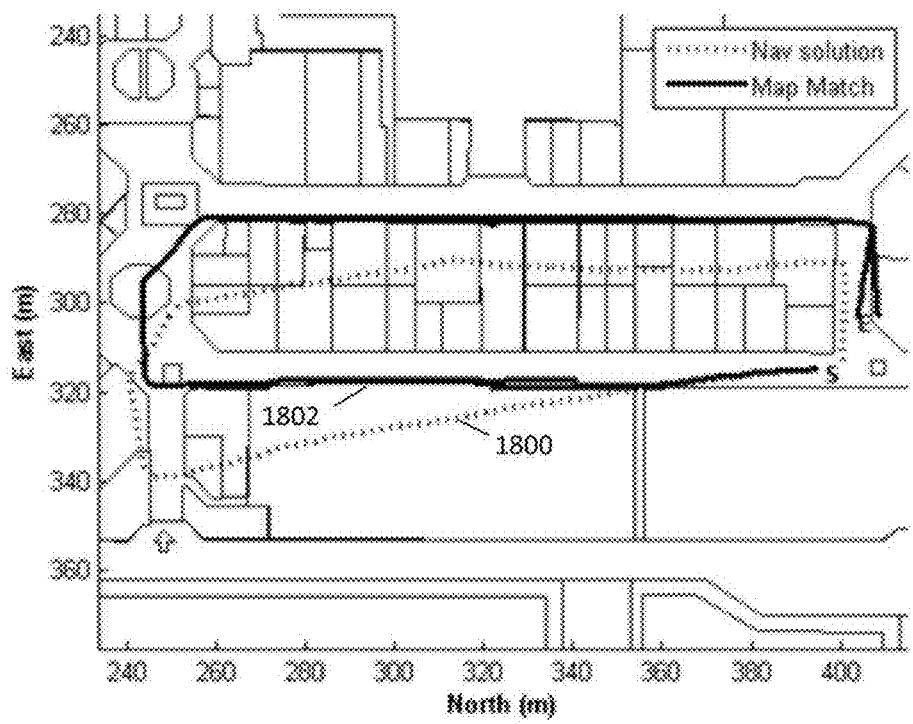
FIG. 18 is a schematic representation comparing multiple hypotheses in a corridor scenario with a hand-held use mode according to an embodiment.

In a next scenario, a user walked around the corridor of the mall with the smart phone in the hand-held use case. The position outputs from both navigation module 120 as trace 1800 and position estimator 126 of map module 124 as trace 1802 are shown in FIG. 18. The "s" represents the starting point and the "e" represents the ending point. Because of the accumulated gyro drift, the initial navigation solution provided by navigation module 120 generates skewed outputs. Multiple hypotheses are shown to have been generated along the walls of the shops lining the mall corridors.

Figure 19:
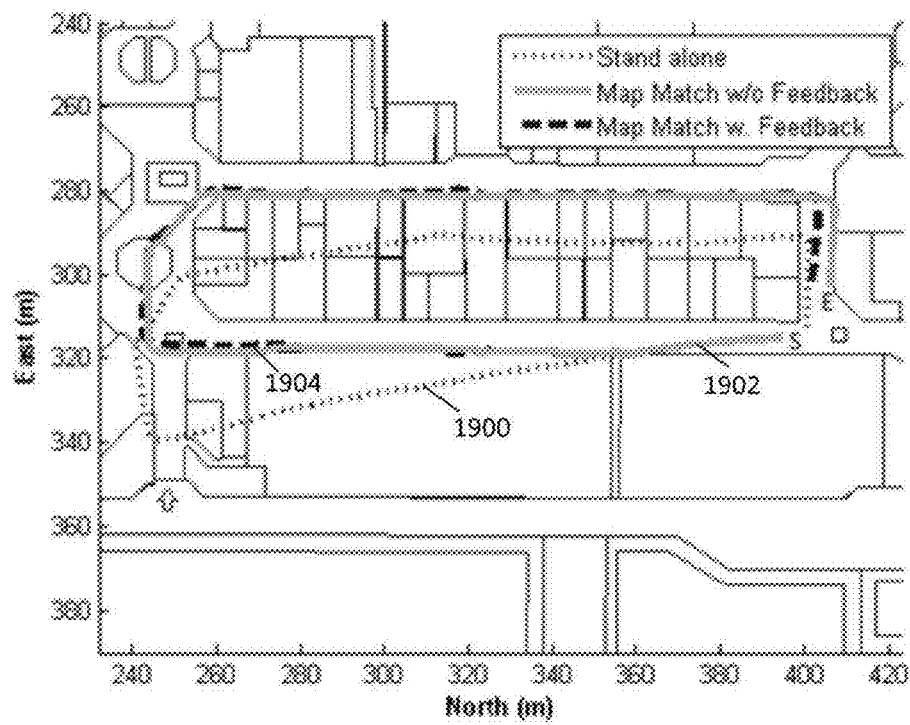
FIG. 19 is a schematic representation comparing navigation solutions in a corridor scenario with a hand-held use mode according to an embodiment.

Due to the relatively small angle between the user heading and the intersection edge, no wall-crossing event was declared. The map information aided heading provided by map module 124 reflects the orientation of the walls. The results from the stand alone integrated navigation and map aided solution without feedbacks and the map aided results with feedbacks for the corridor only scenario in FIG. 19, with trace 1900 indicating the results of the navigation solution only, trace 1902 indicating an enhanced navigation solution without feedback to navigation module 120 and trace 1904 indicating an enhanced navigation solution with feedback to navigation module 120. In this case, both the map aided solution with and without feedbacks outperform the standalone integrated navigation solution from navigation module 120.

Figure 20:
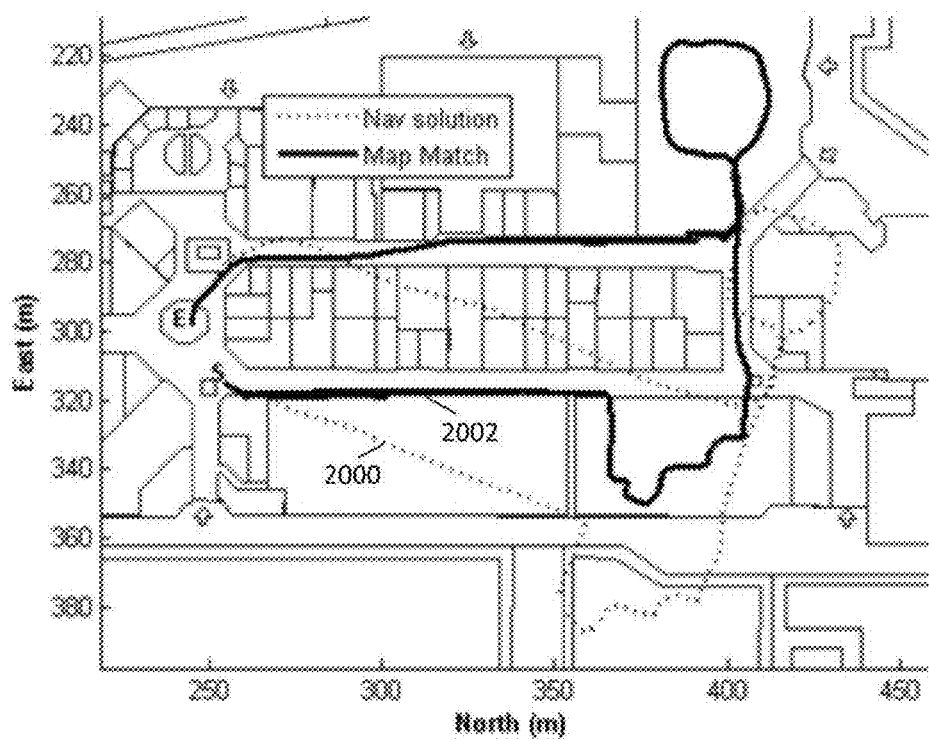
FIG. 20 is a schematic representation comparing multiple hypotheses in a room change scenario with a hand-held use mode according to an embodiment.
Figure 21:
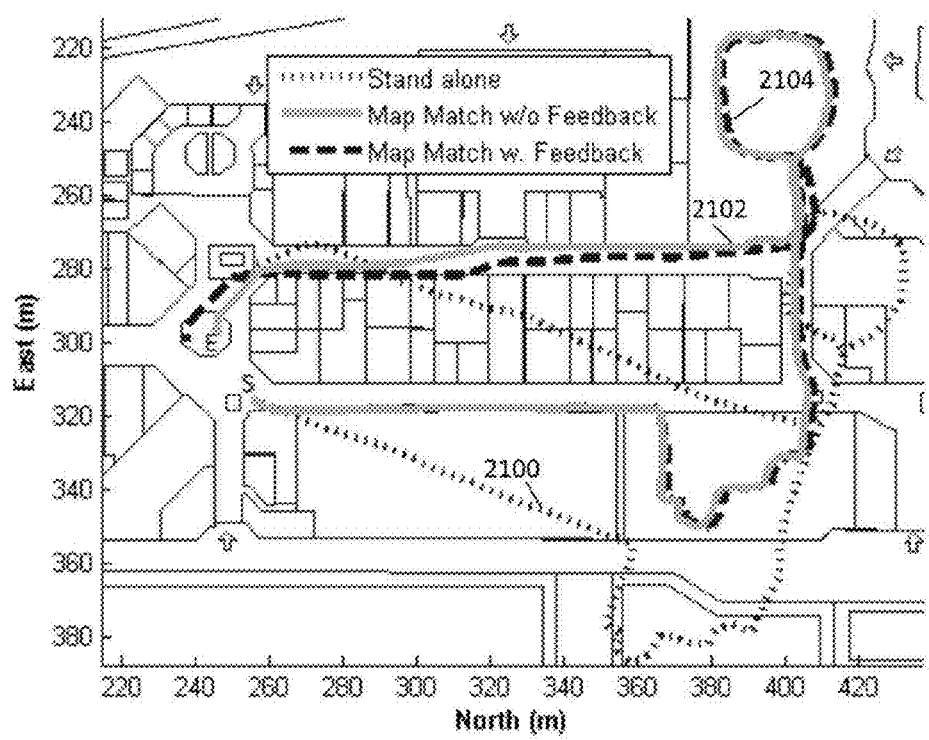
FIG. 21 is a schematic representation comparing navigation solutions in a room change scenario with a hand-held use mode according to an embodiment.

In a next scenario of the field test, the user entered and exited rooms with the phones operated in different use cases. FIG. 20 and FIG. 21 show the results with the phone being hand held. The multi-hypothesis outputs from position estimator 126 are illustrated in FIG. 20, with the results of the navigation solution alone indicated by trace 2000 and updated estimated position information indicted by trace 2002 and 2004. The error in the heading from the navigation solution of navigation module 120 has been correctly compensated with the map aided algorithm of map module 124. Furthermore, the algorithm also successfully detects the wall-crossing events. The results from the stand alone, map aided navigation with and without feedbacks are shown in FIG. 21, with trace 2100 indicating the results of the navigation solution only, trace 2102 indicating an enhanced navigation solution without feedback to navigation module 120 and trace 2104 indicating an enhanced navigation solution with feedback to navigation module 120.

Figure 22:
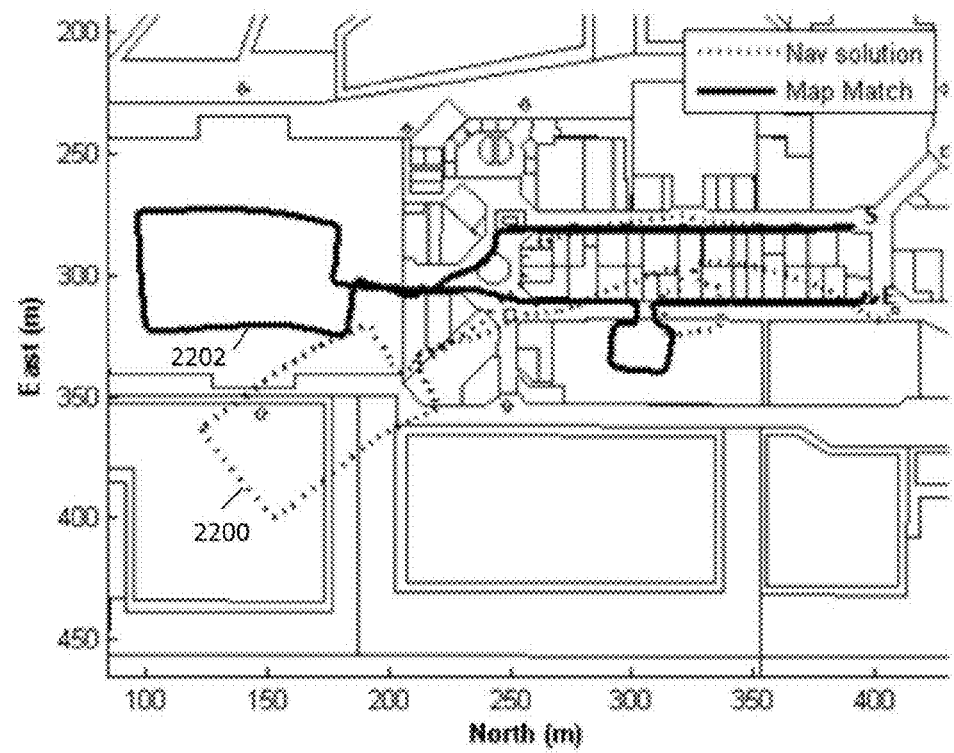
FIG. 22 is a schematic representation comparing multiple hypotheses in a room change scenario with a pocket use mode according to an embodiment.
Figure 23:
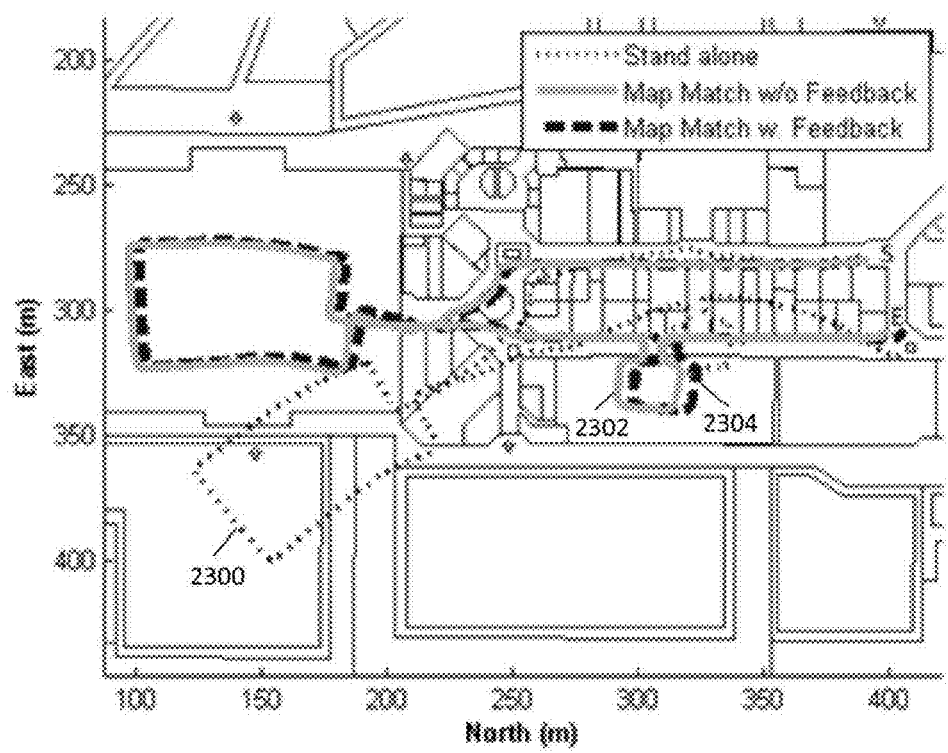
FIG. 23 is a schematic representation comparing navigation solutions in a room change scenario with a pocket use mode according to an embodiment.

FIG. 22 and FIG. 23 show the results from a trajectory with the phone in the pocket. In FIG. 22, trace 2200 indicates the results of the navigation solution only and trace 2102 indicates an enhanced navigation solution, while in FIG. 23, trace 2300 indicates the results of the navigation solution only, trace 2302 indicates an enhanced navigation solution without feedback of the updated estimated position information to navigation module 120 and trace 2304 indicates an enhanced navigation solution with feedback. As shown, the techniques of this disclosure provide improved navigation performance compared with the stand alone integrated system with the successful detection of wall-crossing. FIG. 23 also indicates that better performance may be provided by employing a map aided solution with feedback.

Figure 24:
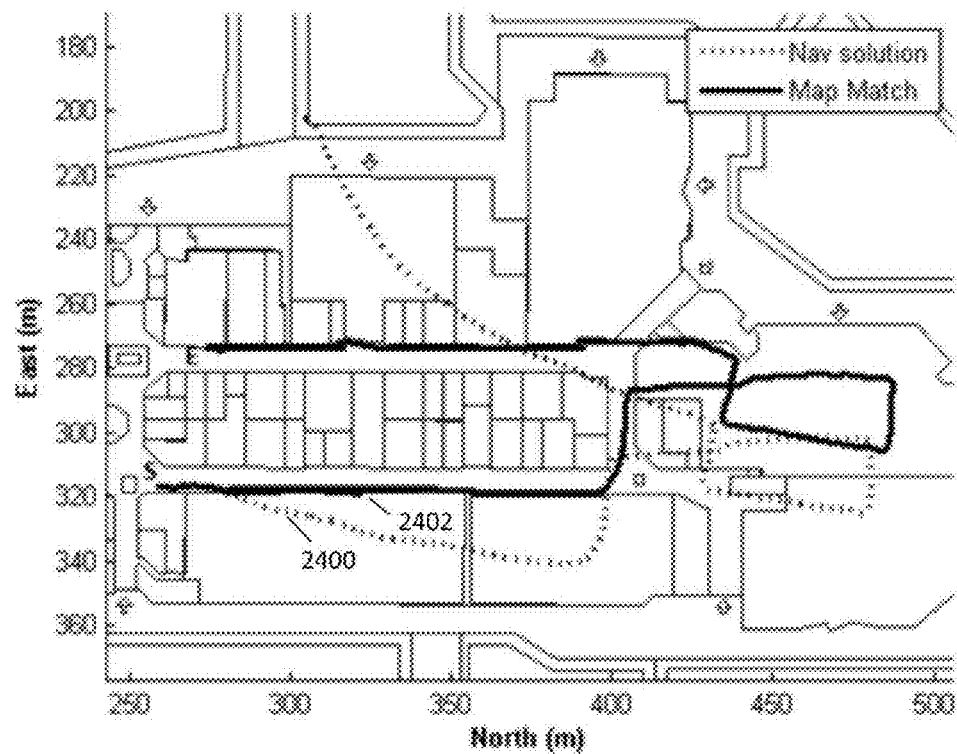
FIG. 24 is a schematic representation comparing multiple hypotheses in a room change scenario with varying use modes according to an embodiment.
Figure 25:
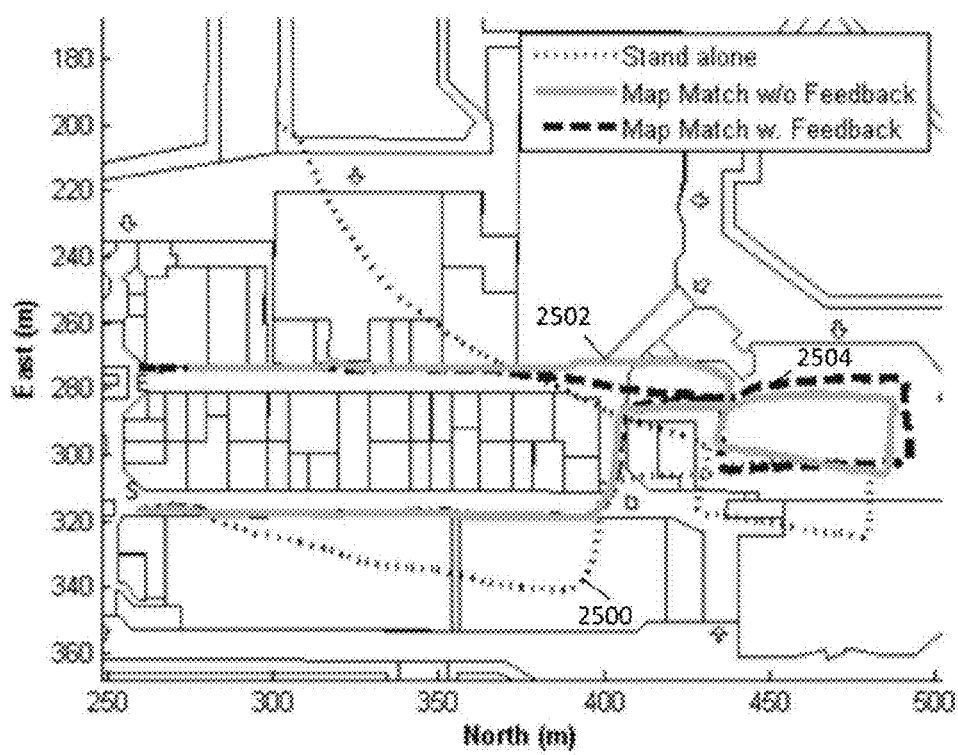
FIG. 25 is a schematic representation comparing navigation solutions in a room change scenario with varying use modes according to an embodiment.

A similar analysis was applied to a more complex scenario with the phone operated in different use cases during the test. The phone was operated in the hand-held mode at the beginning, then was transferred to the dangling mode at ⅓ of the test route, and was finally returned to the hand-held mode. FIG. 24 and FIG. 25 present the results from this trajectory, with trace 2400 indicating the results of the navigation solution only, trace 2402 indicating an enhanced navigation solution and trace 2500 indicating the results of the navigation solution only, trace 2502 indicating an enhanced navigation solution without feedback and trace 2504 indicating an enhanced navigation solution with feedback. In this case, the map aided navigation solution with feedbacks outperforms the system without feedback as shown in FIG. 25.

Figure 26:
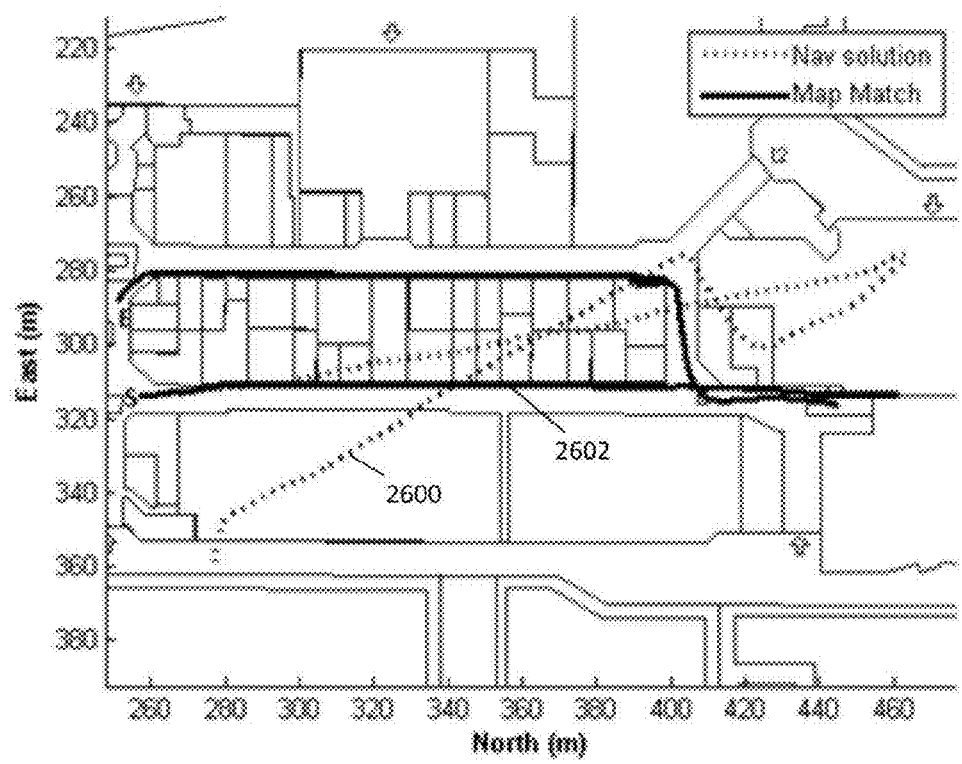
FIG. 26 is a schematic representation comparing multiple hypotheses in an escalator level change scenario for a first level with a hand-held use mode according to an embodiment.
Figure 27:
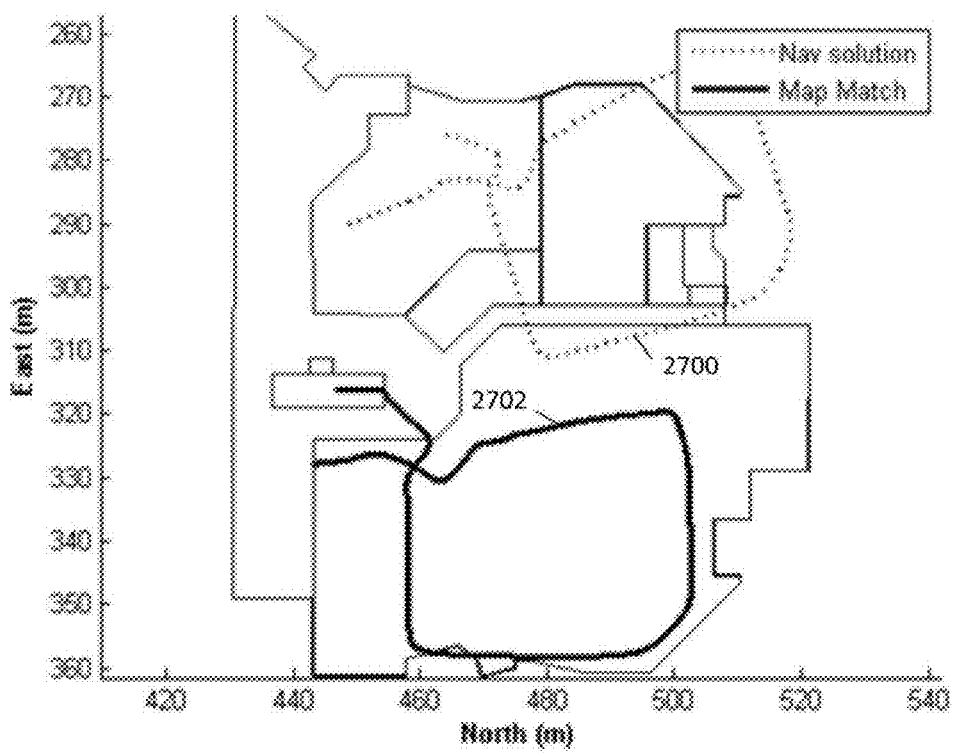
FIG. 27 is a schematic representation comparing multiple hypotheses in an escalator level change scenario for a second level with a hand-held use mode according to an embodiment.
Figure 28:
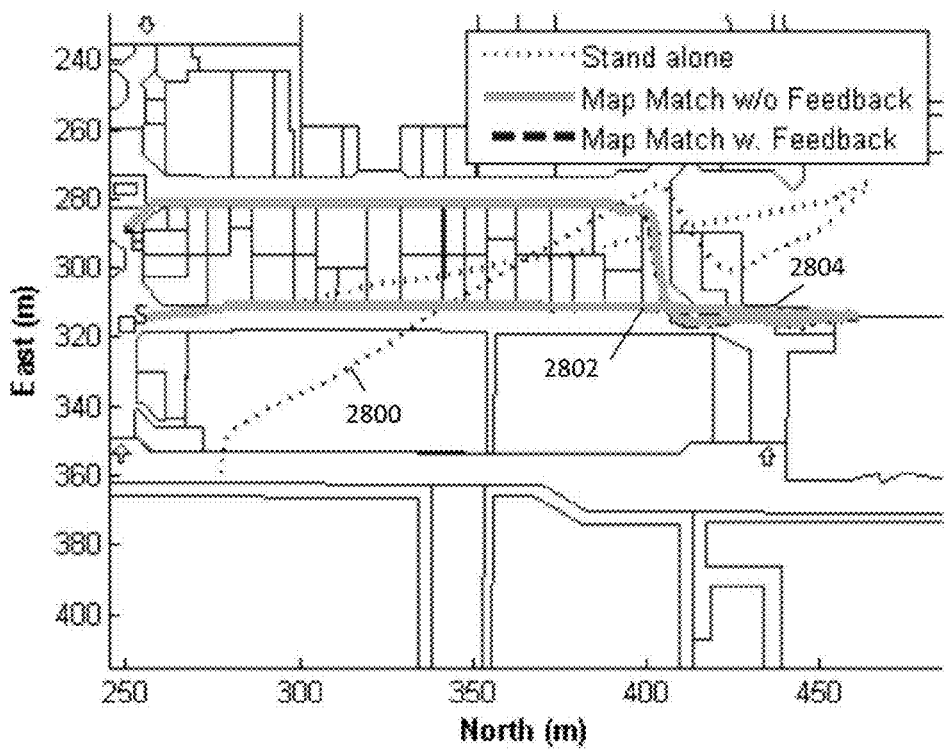
FIG. 28 is a schematic representation comparing navigation solutions in an escalator level change scenario for a first level with a hand-held use mode according to an embodiment.
Figure 29:
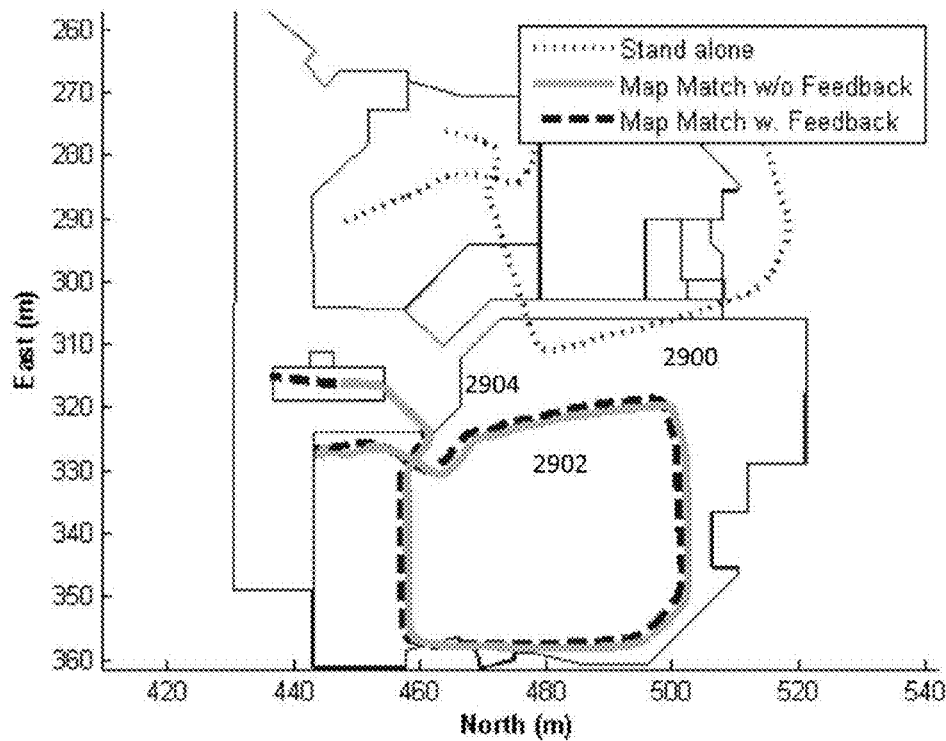
FIG. 29 is a schematic representation comparing navigation solutions in an escalator level change scenario for a second level with a hand-held use mode according to an embodiment.

Another scenario of the field test involved a user taking elevators or escalators to switch between two levels of the mall. Representing a first set of conditions, FIG. 26. FIG. 27, FIG. 28 and FIG. 29 illustrate the results when a user took an escalator to go up and down with the phone operated in the hand-held mode. In FIG. 26, trace 2600 indicates the results of the navigation solution only and trace 2602 indicates an enhanced navigation solution. In FIG. 27, trace 2700 indicates the results of the navigation solution only and trace 2702 indicates an enhanced navigation solution trace. In FIG. 28, trace 2800 indicates the results of the navigation solution only, trace 2802 indicates an enhanced navigation solution without feedback of the updated estimated position information to navigation module 120 and trace 2804 indicates an enhanced navigation solution with feedback. In FIG. 29, trace 2900 indicates the results of the navigation solution only, trace 2902 indicates an enhanced navigation solution without feedback of the updated estimated position information to navigation module 120 and trace 2904 indicates an enhanced navigation solution with feedback. As shown in these figures, after the detection of a level change event, all the current available hypotheses were eliminated and a new hypothesis near the escalator with the correct heading was created. The heading after the level change event was successfully maintained without corrupting the whole trajectory.

Figure 30:
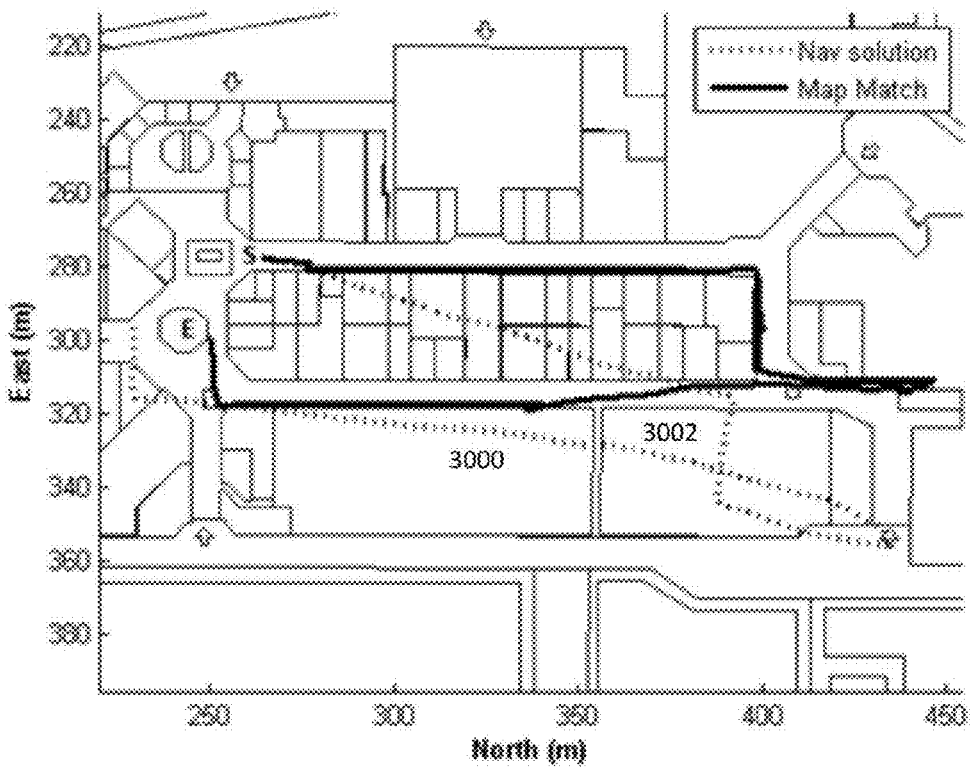
FIG. 30 is a schematic representation comparing multiple hypotheses in an elevator level change scenario for a first level with a hand-held use mode according to an embodiment.
Figure 31:
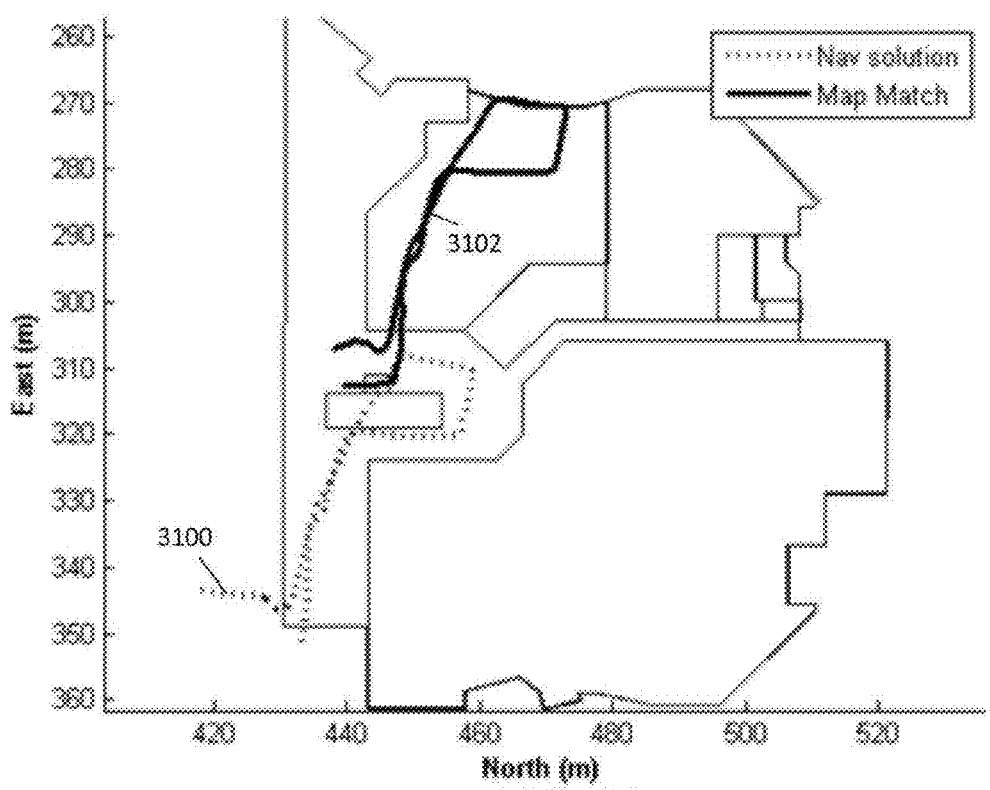
FIG. 31 is a schematic representation comparing multiple hypotheses in an elevator level change scenario for a second level with a hand-held use mode according to an embodiment.
Figure 32:
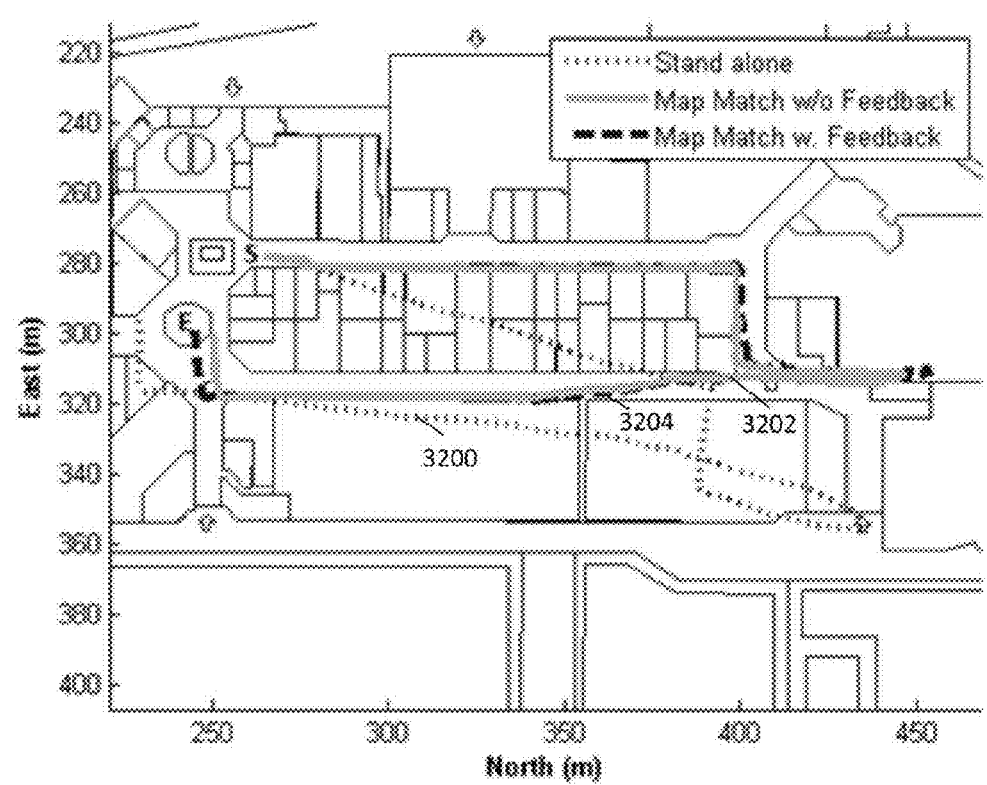
FIG. 32 is a schematic representation comparing navigation solutions in an elevator level change scenario for a first level with a hand-held use mode according to an embodiment.
Figure 33:
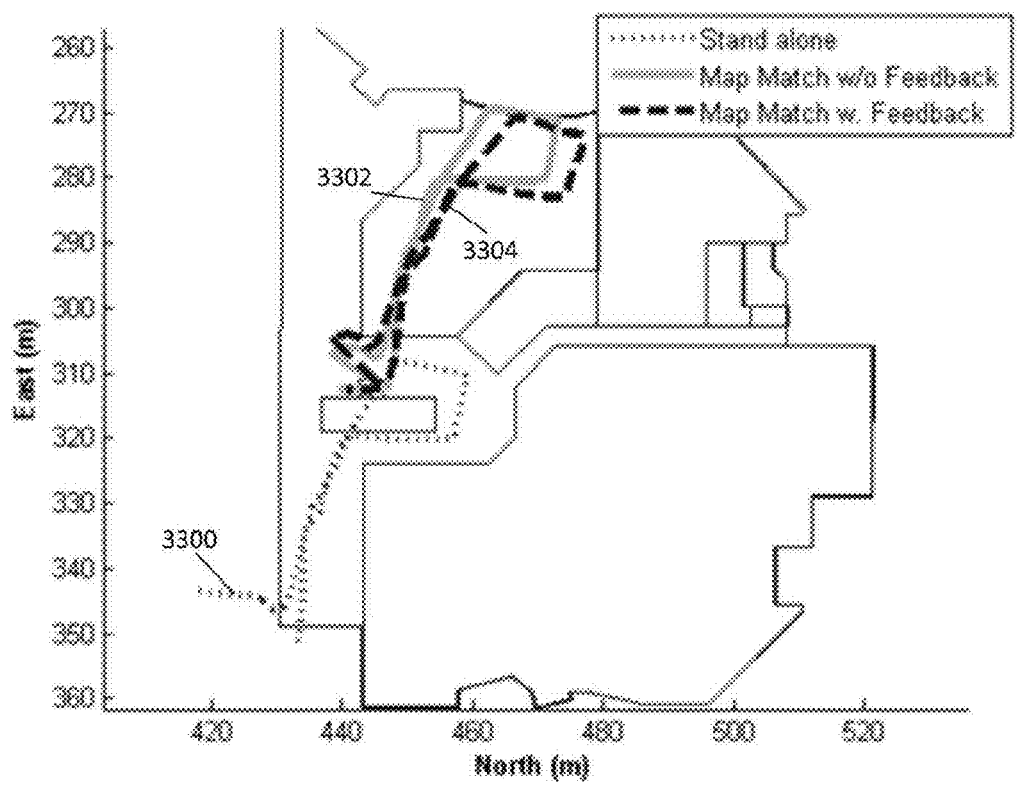
FIG. 33 is a schematic representation comparing navigation solutions in an elevator level change scenario for a second level with a hand-held use mode according to an embodiment.

Next, FIG. 30. FIG. 31, FIG. 32 and FIG. 33 show the results when a user took an elevator in up and down level changes. In FIG. 30, trace 3000 indicates the results of the navigation solution only and trace 3002 indicates an enhanced navigation solution. In FIG. 31, trace 3100 indicates the results of the navigation solution only and trace 3102 indicates an enhanced navigation solution trace. In FIG. 32, trace 3200 indicates the results of the navigation solution only, trace 3202 indicates an enhanced navigation solution without feedback of the updated estimated position information to navigation module 120 and trace 3204 indicates an enhanced navigation solution with feedback. In FIG. 33, trace 3300 indicates the results of the navigation solution only, trace 3302 indicates an enhanced navigation solution without feedback of the updated estimated position information to navigation module 120 and trace 3304 indicates an enhanced navigation solution with feedback.

Figure 34:
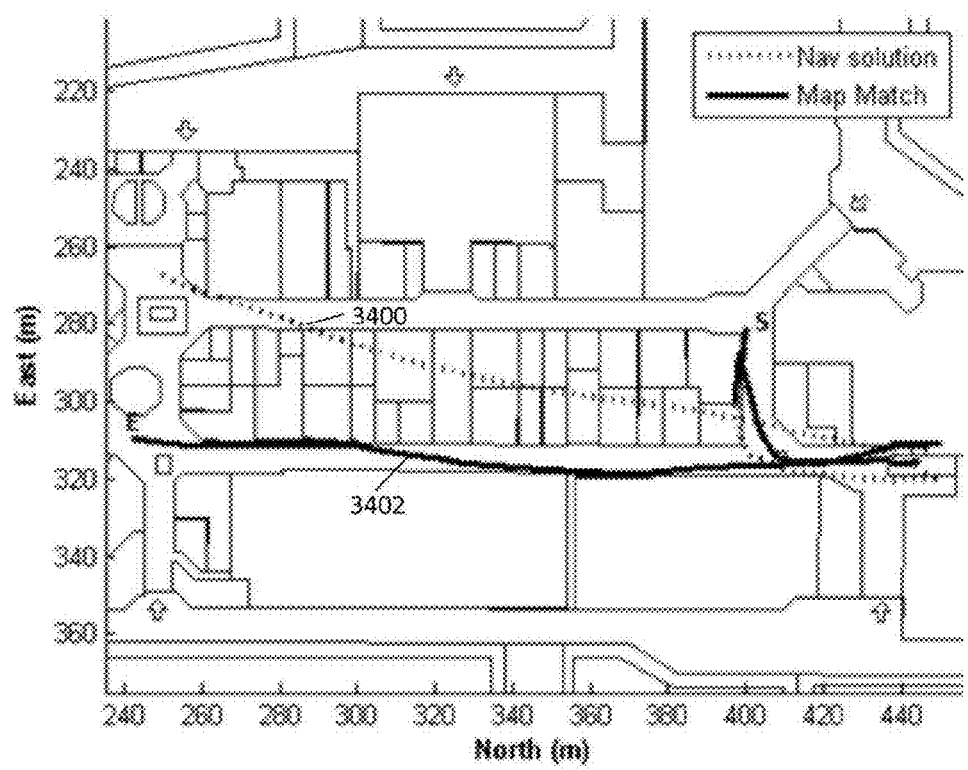
FIG. 34 is a schematic representation comparing multiple hypotheses in an elevator/escalator level change scenario for a first level with a hand-held use mode according to an embodiment.
Figure 35:
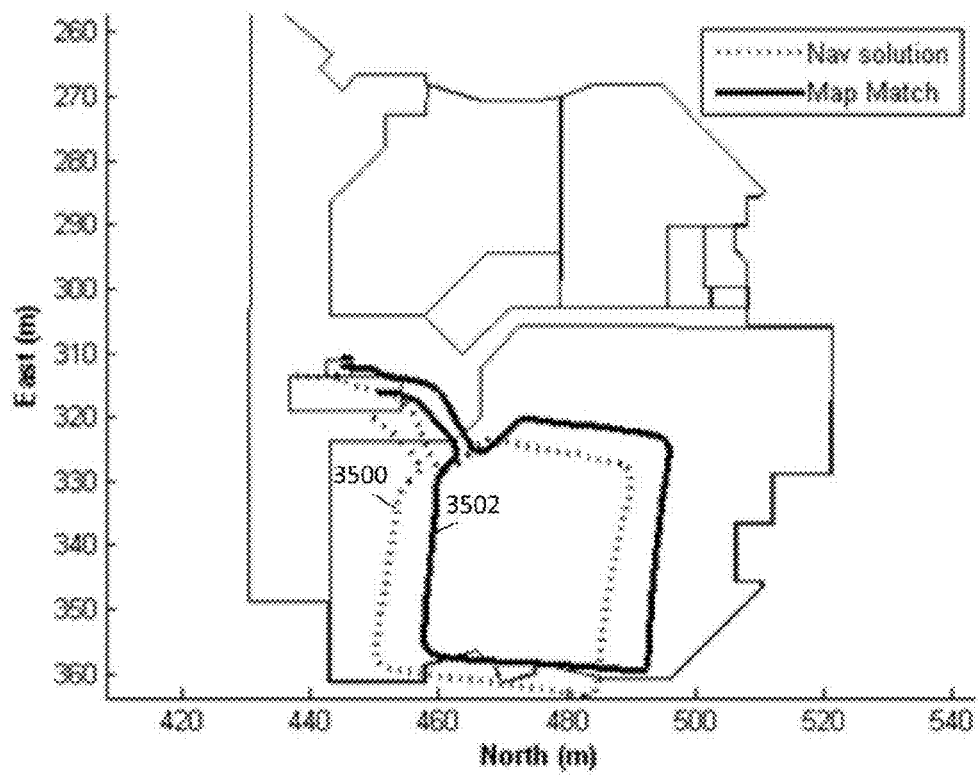
FIG. 35 is a schematic representation comparing multiple hypotheses in an elevator/escalator level change scenario for a second level with a hand-held use mode according to an embodiment.
Figure 36:
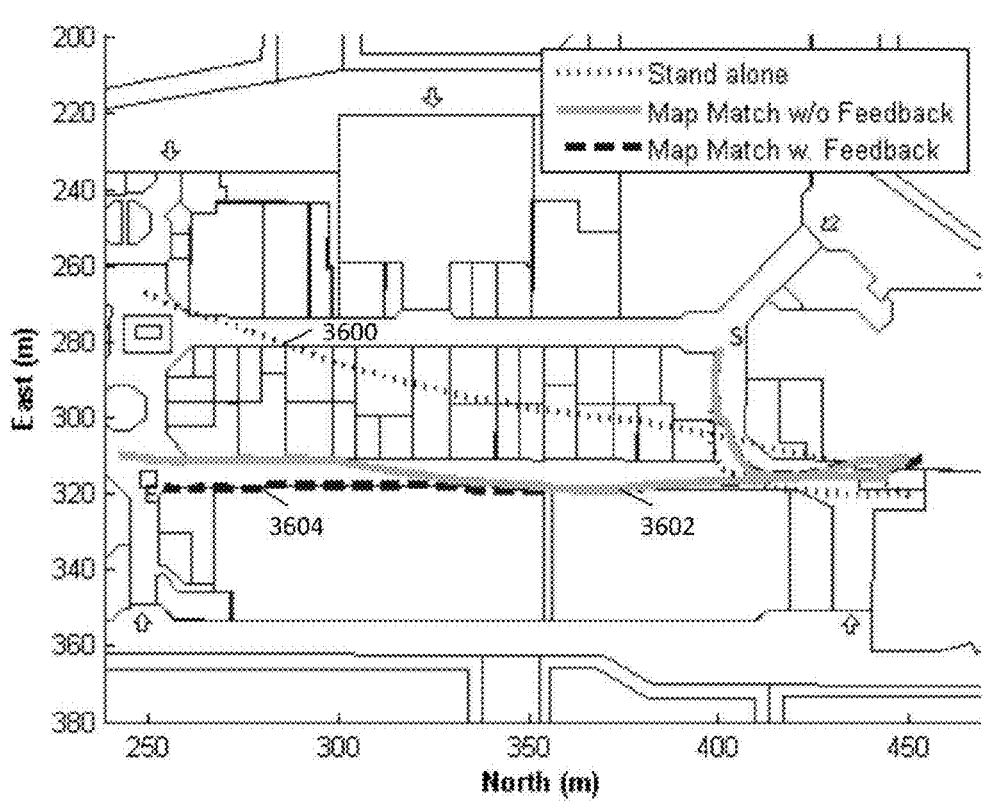
FIG. 36 is a schematic representation comparing navigation solutions in an elevator/escalator level change scenario for a first level with a hand-held use mode according to an embodiment.
Figure 37:
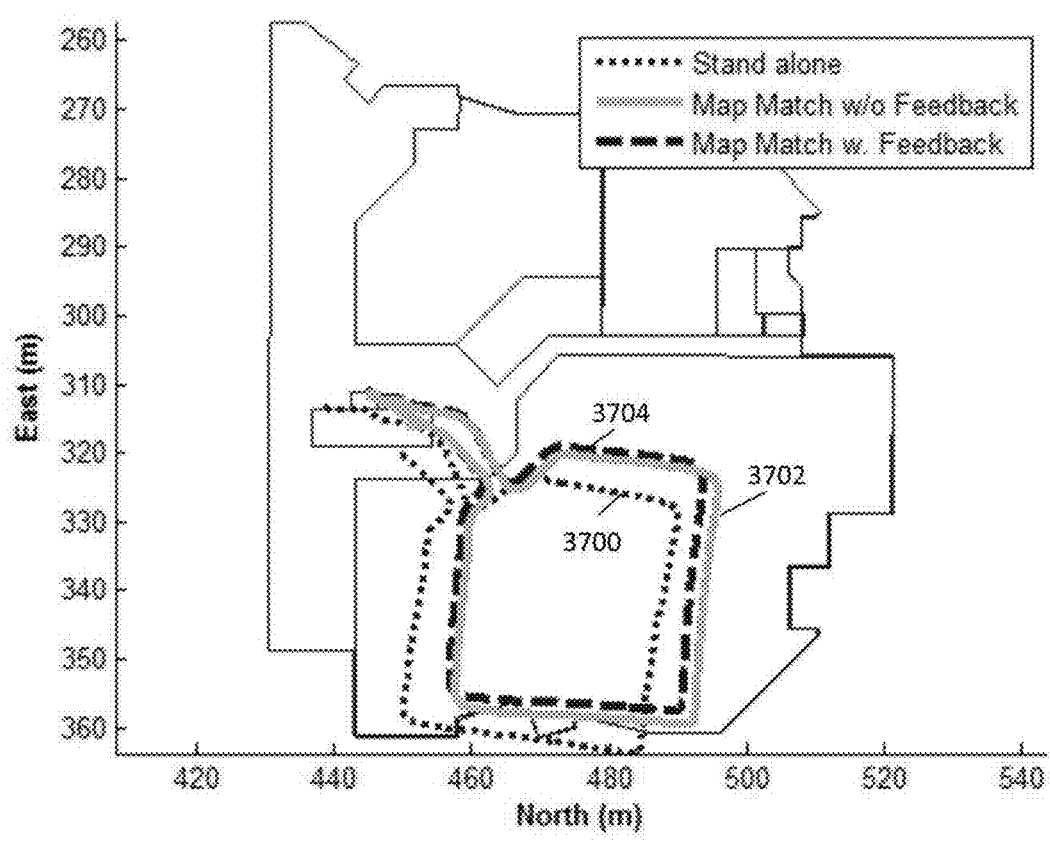
FIG. 37 is a schematic representation comparing navigation solutions in an elevator/escalator level change scenario for a second level with a hand-held use mode according to an embodiment.

Finally, FIG. 34. FIG. 35, FIG. 36 and FIG. 37 show the results when a user took an escalator up and took an elevator down when changing levels. In FIG. 34, trace 3400 indicates the results of the navigation solution only and trace 3402 indicates an enhanced navigation solution. In FIG. 35, trace 3500 indicates the results of the navigation solution only and trace 3502 indicates an enhanced navigation solution trace. In FIG. 36, trace 3600 indicates the results of the navigation solution only, trace 3602 indicates an enhanced navigation solution without feedback of the updated estimated position information to navigation module 120 and trace 3604 indicates an enhanced navigation solution with feedback. In FIG. 37, trace 3700 indicates the results of the navigation solution only, trace 3702 indicates an enhanced navigation solution without feedback of the updated estimated position information to navigation module 120 and trace 3704 indicates an enhanced navigation solution with feedback.

To summarize, the techniques of this disclosure reliably handle the level change events and enhance the navigation solution significantly. In addition, providing the updated estimated position information as feedback to navigation module 120 provides improved navigation performance over the solution from the navigation module without feedback.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for enhancing a navigation solution of a portable device and a platform using map information, wherein the mobility of the device is constrained or unconstrained within the platform and wherein the device may be tilted to any orientation, the method comprising:
   a) obtaining sensor data for the portable device;
   b) deriving a navigation solution based at least in part on the sensor data;
   c) providing estimated position information for the portable device based at least in part on the navigation solution;
   d) obtaining map information for an area encompassing a current location of the user;
   e) generating multiple hypotheses regarding possible positions of the portable device based at least in part on the estimated position information and the map information;
   f) managing the hypotheses based at least in part on the estimated position information and the map information, wherein managing the hypotheses comprises adding, eliminating and combining hypotheses;
   g) processing the managed hypotheses to update the estimated position information for the portable device; and
   h) providing an enhanced navigation solution using the updated estimated position information.

2. The method of claim 1, wherein the updated estimated information comprises the enhanced navigation solution.

3. The method of claim 1, wherein the updated estimated information is fed to the navigation solution to derive the enhanced navigation solution.

4. The method of claim 3, wherein the deriving of the enhanced navigation solution utilizes the updated estimated position information as a measurement update to the navigation module.

5. The method of claim 1, wherein the enhanced navigation solution comprises values from the updated estimated information and the navigation solution.

6. The method of claim 1, further comprising obtaining absolute navigation information for the portable device, wherein deriving the navigation solution is further based on the absolute navigation information.

7. The method of claim 6, wherein the absolute navigation information is obtained from any one or any combination of the following: (i) a global navigation satellite system (GNSS); (ii) cell-based positioning; (iii) WiFi-based positioning; or (iv) other wireless-based positioning.

8. The method of claim 1, wherein generating multiple hypotheses regarding possible positions of the portable device is further based on updated position information from a previous epoch.

9. The method of claim 1, further comprising preprocessing the map information.

10. The method of claim 9, wherein preprocessing the map information comprises extracting map entities.

11. The method of claim 10, wherein preprocessing the map information further comprises clipping at least one foreground map entity from a background entity.

12. The method of claim 11, wherein clipping the background entity defines a traversable area.

13. The method of claim 10, wherein preprocessing the map information further comprises representing a map entity as a relatively complex polygon and decomposing the polygon into a plurality of relatively more simple polygons.

14. The method of claim 9, wherein preprocessing the map information comprises generating a grid of connected links and nodes.

15. The method of claim 1, wherein the estimated position information comprises an error region representing potential positions of the portable device.

16. The method of claim 15, wherein at least one of the hypotheses is generated by projecting the error region onto the map information.

17. The method of claim 15, wherein a plurality of hypotheses are generated by projecting the error region onto the map information when an overlap with a plurality of map entities occurs.

18. The method of claim 15, wherein the map information comprises a polygon based geometric map.

19. The method of claim 15, wherein the map information comprises a grid map.

20. The method of claim 1, wherein the map information comprises a grid map and the estimated position information is based at least in part on a correlation between a determined user trajectory and a topological feature of the grid map.

21. The method of claim 1, wherein managing the hypotheses further comprises applying a decision making logic.

22. The method of claim 21, wherein the decision making logic is configured for a wall crossing event.

23. The method of claim 21, wherein the decision making logic is configured for a level change event.

24. The method of claim 1, wherein the navigation solution comprises a motion mode for the user.

25. The method of claim 24, wherein the estimated position information is based at least in part on the motion mode.

26. The method of claim 24, wherein the hypotheses are managed based at least in part on the motion mode.

27. The method of claim 24, wherein a level change event is based at least in part on the motion mode.

28. The method of claim 1, wherein the enhanced navigation solution comprises a motion mode for the user detected based at least in part on a map entity associated with the estimated position information.

29. The method of claim 1, wherein position information for the portable device is estimated using at least one of a prediction only Kalman filter, a near constant velocity Kalman filter, a prediction only particle filter and a near constant velocity particle filter.

30. The method of claim 1, wherein at least one of obtaining map information, generating multiple hypotheses, managing the hypotheses, and processing the managed hypotheses to update the estimated position information for the portable device is performed remotely.

31. A portable device for providing an enhanced navigation solution using map information comprising:
   a) a sensor assembly integrated with the portable device, configured to output data representing motion of the portable device; and
   b) a processor configured to implement:
      i) a navigation module for deriving a navigation solution based at least in part on the sensor data; and
      ii) a map module having a position estimator for providing estimated position information for the portable device based at least in part on the navigation solution, a map handler for obtaining map information for an area encompassing a current location of the user and a hypothesis analyzer for generating and managing multiple hypotheses regarding possible positions of the portable device based at least in part on the estimated position information and the map information, wherein the map module processes the managed hypotheses to update the estimated position information for the portable device, wherein managing multiple hypotheses comprises adding, eliminating and combining hypotheses.

32. The device of claim 31, further comprising a source of absolute navigation information for the portable sensor device, wherein the absolute navigation information aids the navigation solution.

33. The device of claim 32, wherein the absolute navigation information is obtained from any one or any combination of the following: (i) a global navigation satellite system (GNSS); (ii) cell-based positioning; (iii) WiFi-based positioning; or (iv) other wireless-based positioning.

34. The device of claim 31, wherein the map module is further configured to provide an enhanced navigation solution, wherein the updated estimated information comprises the enhanced navigation solution.

35. The device of claim 31, further comprising feeding the updated estimated position information to the navigation module, wherein the navigation module is further configured to enhance the navigation solution using the updated estimated position information.

36. The device of claim 35, wherein the enhancing of the navigation solution utilizes the updated estimated position information as a measurement update to the navigation module.

37. The device of claim 31, wherein the map module is further configured to provide an enhanced navigation solution, wherein the enhanced navigation solution comprises values from the updated estimated information and the navigation solution.

38. The portable device of claim 31, wherein the sensor assembly includes an accelerometer and a gyroscope.

39. The device of claim 31, wherein the sensor assembly comprises an inertial sensor implemented as a Micro Electro Mechanical System (MEMS).

40. A system for providing an enhanced navigation solution using map information comprising:
   a) a portable device with an integrated sensor assembly, configured to output data representing motion of the portable device and a processor configured to implement a navigation module for deriving a navigation solution based at least in part on the sensor data; and
   b) remote processing resources configured to receive the navigation solution from the portable device and having a processor configured to implement a map module having a position estimator for providing estimated position information for the portable device based at least in part on the navigation solution, a map handler for obtaining map information for an area encompassing a current location of the user and a hypothesis analyzer for generating and managing multiple hypotheses regarding possible positions of the portable device based at least in part on the estimated position information and the map information, wherein the map module processes the managed hypotheses to update the estimated position information for the portable device wherein the remote processing resources transmit the updated estimated position information to the portable device, wherein managing multiple hypotheses comprises adding, eliminating and combining hypotheses.

41. The system of claim 40, wherein the device is further configured to provide an enhanced navigation solution, wherein the updated estimated information comprises the enhanced navigation solution.

42. The system of claim 40, further comprising feeding the updated estimated position information to the navigation module, wherein the navigation module is further configured to enhance the navigation solution using the updated estimated position information.

43. The system of claim 42, wherein the enhancing of the navigation solution utilizes the updated estimated position information as a measurement update to the navigation module.

44. The system of claim 40, wherein the device is further configured to provide an enhanced navigation solution, wherein the enhanced navigation solution comprises values from the updated estimated information and the navigation solution.

* * * * *